(12) United States Patent
Tokuhiro et al.

(10) Patent No.: US 12,528,454 B2
(45) Date of Patent: Jan. 20, 2026

(54) PARKING SUPPORT METHOD AND PARKING SUPPORT DEVICE

(71) Applicant: PANASONIC INTELLECTUAL PROPERTY MANAGEMENT CO., LTD., Osaka (JP)

(72) Inventors: Takafumi Tokuhiro, Kanagawa Ken (JP); Shota Akaura, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 739 days.

(21) Appl. No.: 17/590,271

(22) Filed: Feb. 1, 2022

(65) Prior Publication Data
US 2022/0274586 A1    Sep. 1, 2022

(30) Foreign Application Priority Data

Mar. 1, 2021 (JP) ................................ 2021-032108
Nov. 29, 2021 (JP) ................................ 2021-193605

(51) Int. Cl.
| | |
|---|---|
| *B60W 30/06* | (2006.01) |
| *B60W 30/18* | (2012.01) |
| *B60W 40/09* | (2012.01) |

(52) U.S. Cl.
CPC ...... *B60W 30/06* (2013.01); *B60W 30/18109* (2013.01); *B60W 40/09* (2013.01);
(Continued)

(58) Field of Classification Search
CPC ...... B60W 10/04; B60W 10/10; B60W 10/18; B60W 10/20; B60W 30/06;
(Continued)

(56) References Cited

U.S. PATENT DOCUMENTS

| | | |
|---|---|---|
| 9,140,553 B2 | 9/2015 | Grimm et al. |
| 2010/0283632 A1 | 11/2010 | Kawabata et al. |

(Continued)

FOREIGN PATENT DOCUMENTS

| | | |
|---|---|---|
| DE | 112016005614 | 9/2018 |
| JP | 2006-306224 | 11/2006 |

(Continued)

OTHER PUBLICATIONS

Office Action from Japan Patent Office (JPO) in Japanese Patent Appl. No. 2021-193605, dated Apr. 1, 2025, together with an English language translation.

(Continued)

*Primary Examiner* — Peter D Nolan
*Assistant Examiner* — Ce Li Li
(74) *Attorney, Agent, or Firm* — Greenblum & Bernstein, P.L.C.

(57) ABSTRACT

A parking support method according to the present disclosure is a method of performing automatic traveling of a vehicle based on a parking operation performed in the past. The method includes: storing, in a storage unit, information on at least one of a traveling route and a parking target position in the parking operation performed in the past; and displaying, on a display unit, guidance information on a target position where automatic traveling of the vehicle can be performed based on at least one of the traveling route and the parking target position.

16 Claims, 19 Drawing Sheets

(52) U.S. Cl.
CPC ............ *B60W 2554/4041* (2020.02); *B60W 2554/4049* (2020.02)

(58) Field of Classification Search
CPC .......... B60W 30/18109; B60W 40/09; B60W 50/0098; B60W 50/10; B60W 50/14; B60W 2050/146; B60W 2420/403; B60W 2554/4041; B60W 2554/4049; B60W 2556/10; B60W 2556/40; B60W 2710/1005; B60W 2710/18; B60W 2710/20; B60W 2720/106; B60W 2720/125; B62D 15/028; B62D 15/0285
See application file for complete search history.

(56) References Cited

U.S. PATENT DOCUMENTS

| | | | |
|---|---|---|---|
| 2011/0246027 | A1 | 10/2011 | Miyajima |
| 2018/0194344 | A1* | 7/2018 | Wang ................ G05D 1/027 |
| 2018/0328750 | A1* | 11/2018 | Yun .................. G06V 20/586 |
| 2018/0362023 | A1* | 12/2018 | Kim .................. B62D 15/027 |
| 2021/0003414 | A1 | 1/2021 | Yamaguchi et al. |
| 2021/0387614 | A1* | 12/2021 | Tashiro ............... B60W 10/18 |
| 2022/0355800 | A1* | 11/2022 | Miyazaki ........... B60W 60/001 |
| 2023/0296395 | A1 | 9/2023 | Kumon |
| 2024/0051604 | A1* | 2/2024 | Hüger ................ G08G 1/143 |
| 2024/0075921 | A1* | 3/2024 | Paula ................. B60W 30/06 |

FOREIGN PATENT DOCUMENTS

| | | |
|---|---|---|
| JP | 2007-126086 | 5/2007 |
| JP | 2007-290555 | 11/2007 |
| JP | 2011-215975 | 10/2011 |
| JP | 2014-034251 | 2/2014 |
| JP | 6022447 | 11/2016 |
| JP | 2017-067466 | 4/2017 |
| JP | 2017-182565 | 10/2017 |
| JP | 2018-154299 | 10/2018 |
| JP | 2018-207289 | 12/2018 |
| JP | 2019-174456 | 10/2019 |
| JP | 2020-069958 | 5/2020 |
| JP | 2020-131897 | 8/2020 |
| JP | 2020-163931 | 10/2020 |
| JP | 2021-008243 | 1/2021 |
| WO | 2017/072941 | 5/2017 |

OTHER PUBLICATIONS

Office Action from Japan Patent Office (JPO) in Japanese Patent Appl. No. 2021-193605, dated Jun. 17, 2025, together with an English language translation.

English language translation of Office Action issued by the German Patent and Trademark Office in German Patent Appl. No. 102022102697.3, dated Sep. 19, 2025.

Office Action from Japan Patent Office (JPO) in Japanese Patent Appl. No. 2025-141947, dated Oct. 21, 2025, together with an English language translation.

Decision to Grant a Patent from Japan Patent Office (JPO) in Japanese Patent Appl. No. 2025-142035, dated Nov. 25, 2025, together with an English language translation.

Office Action from Japan Patent Office (JPO) in Japanese Patent Appl. No. 2025-142036, dated Dec. 2, 2025, together with an English language translation thereof.

* cited by examiner

PARKING SUPPORT METHOD AND PARKING SUPPORT DEVICE

CROSS-REFERENCE TO RELATED APPLICATIONS

This application is based upon and claims the benefit of priority from Japanese Patent Application No. 2021-032108, filed on Mar. 1, 2021 and Japanese Patent Application No. 2021-193605, filed on Nov. 29, 2021, the entire contents of which are incorporated herein by reference.

FIELD

The present disclosure relates to a parking support method and a parking support device.

BACKGROUND

In the related art, there are known parking support techniques of moving a vehicle by automatic driving at the time of parking the vehicle. The parking support techniques include a technique of performing parking support by learning a traveling route based on teacher traveling performed by a driver, and using a learning result thereof. This technique is used in a case of repeatedly performing parking at a determined parking position such as a driver's house or a parking lot of a driver's office, for example (e.g., Japanese Patent No. 6022447).

However, at the time of parking the vehicle by using parking support, if the driver stops the vehicle at a position that is too distant from the learned traveling route, it may be difficult to move the vehicle by automatic driving based on the traveling route.

The present disclosure provides a parking support method and a parking support device that allow the driver to easily grasp a position where the vehicle can be automatically driven based on the traveling route.

SUMMARY

A parking support method according to the present disclosure is a method of performing automatic traveling of a vehicle based on a parking operation performed in the past. The method includes: storing, in a storage unit, information on at least one of a traveling route and a parking target position in the parking operation performed in the past; and displaying, on a display unit, guidance information on a target position where automatic traveling of the vehicle is able to be performed based on at least one of the traveling route and the parking target position.

DETAILED DESCRIPTION

The following describes embodiments of a parking support method and a parking support device according to the present disclosure with reference to the drawings.

First Embodiment

Figure 1:
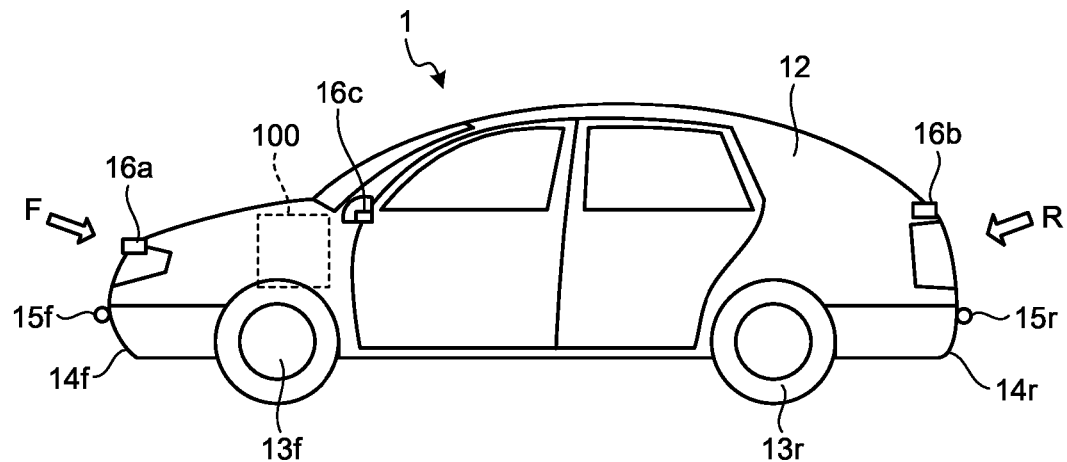
FIG. 1 is a diagram illustrating an example of a vehicle including a parking support device according to a first embodiment.

FIG. 1 is a diagram illustrating an example of a vehicle 1 including a parking support device 100 according to a first embodiment. As illustrated in FIG. 1, the vehicle 1 includes a vehicle body 12, and two pairs of wheels 13 disposed along a predetermined direction on the vehicle body 12. The two pairs of wheels 13 include a pair of front tires 13f and a pair of rear tires 13r.

The front tire 13f illustrated in FIG. 1 is an example of a first wheel in the present embodiment. The rear tire 13r is an example of a second wheel in the present embodiment. The vehicle 1 illustrated in FIG. 1 includes the four wheels 13, but the number of the wheels 13 is not limited thereto. For example, the vehicle 1 may be a two-wheel vehicle.

The vehicle body 12 is coupled to the wheels 13, and can move with the wheels 13. In this case, the predetermined direction in which the two pairs of wheels 13 are disposed is a traveling direction (moving direction) of the vehicle 1. The vehicle 1 can move forward or move backward by shifting a gear (not illustrated), for example. The vehicle 1 can turn right or left by steering.

The vehicle body 12 includes a front end part F as an end part on the front tire 13f side, and a rear end part R as an end part on the rear tire 13r side. The vehicle body 12 has a substantially rectangular shape when viewed from an upper side, and four corner parts of the substantially rectangular shape are called end parts in some cases. Although not illustrated in FIG. 1, the vehicle 1 includes a display device, a speaker, and an operation part.

A pair of bumpers 14 are disposed at the front and rear end parts F and R of the vehicle body 12 in the vicinity of a lower end of the vehicle body 12. A front bumper 14f of the pair of bumpers 14 covers the entire front surface and part of a side surface in the vicinity of a lower end part of the vehicle body 12. A rear bumper 14r of the pair of bumpers 14 covers the entire rear surface and part of the side surface in the vicinity of the lower end part of the vehicle body 12.

A wave transmission/reception units 15f and 15r for transmitting/receiving sound waves such as ultrasonic waves are disposed at predetermined end parts of the vehicle body 12. For example, one or more wave transmission/reception units 15f are disposed on the front bumper 14f, and one or more wave transmission/reception units 15r are disposed on the rear bumper 14r. Hereinafter, the wave transmission/reception units 15f and 15r are simply referred to as wave transmission/reception units 15 in a case of not limiting the wave transmission/reception units 15f and 15r. The number and positions of the wave transmission/reception units 15 are not limited to the example illustrated in FIG. 1. For example, the vehicle 1 may include the wave transmission/reception units 15 disposed on the right and the left sides.

In the present embodiment, sonar using ultrasonic waves is described as an example of the wave transmission/reception unit 15, but the wave transmission/reception unit 15 may be a radar that transmits/receives electromagnetic waves. Alternatively, the vehicle 1 may include both of the sonar and the radar. The wave transmission/reception unit 15 may be simply referred to as a sensor.

More specifically, the wave transmission/reception unit 15 includes a wave transmission unit that transmits sound waves such as ultrasonic waves or electromagnetic waves, and a wave reception unit that receives reflected sound waves, which are sound waves or electromagnetic waves transmitted from the wave transmission part and reflected by an object. The wave transmission/reception unit 15 detects an obstacle around the vehicle 1 based on a transmission/reception result of sound waves or electromagnetic waves. The wave transmission/reception unit 15 also measures a distance between the vehicle 1 and the obstacle around the vehicle 1 based on the transmission/reception result of sound waves or electromagnetic waves.

The vehicle 1 also includes a first imaging device 16a that images a front side of the vehicle 1, a second imaging device 16b that images a rear side of the vehicle 1, a third imaging device 16c that images a left side of the vehicle 1, and a fourth imaging device that images a right side of the vehicle 1. The fourth imaging device is not illustrated in the drawing.

Hereinafter, in a case of not distinguishing the first imaging device 16a, the second imaging device 16b, the third imaging device 16c, and the fourth imaging device from each other, they are simply referred to as imaging devices 16. Positions and the number of the imaging devices are not limited to the example illustrated in FIG. 1. For example, the vehicle 1 may include only two imaging devices, that is, the first imaging device 16a and the second imaging device 16b. Alternatively, the vehicle 1 may further include other imaging devices in addition to the example described above.

The imaging device 16 is a camera that can take an image around the vehicle 1, and take a color image, for example. The image taken by the imaging device 16 may be a moving image or a static image. The imaging device 16 may be a camera built in the vehicle 1, or a camera of a drive recorder or the like retrofitted to the vehicle 1.

The parking support device 100 is mounted on the vehicle 1. The parking support device 100 is an information processing device that can be mounted on the vehicle 1. For example, the parking support device 100 is an Electronic Control Unit (ECU) disposed inside the vehicle 1, or an On Board Unit (OBU). Alternatively, the parking support device 100 may be an external device installed in the vicinity of a dashboard of the vehicle 1. The parking support device 100 may also serve as a car navigation device or the like.

Figure 2:
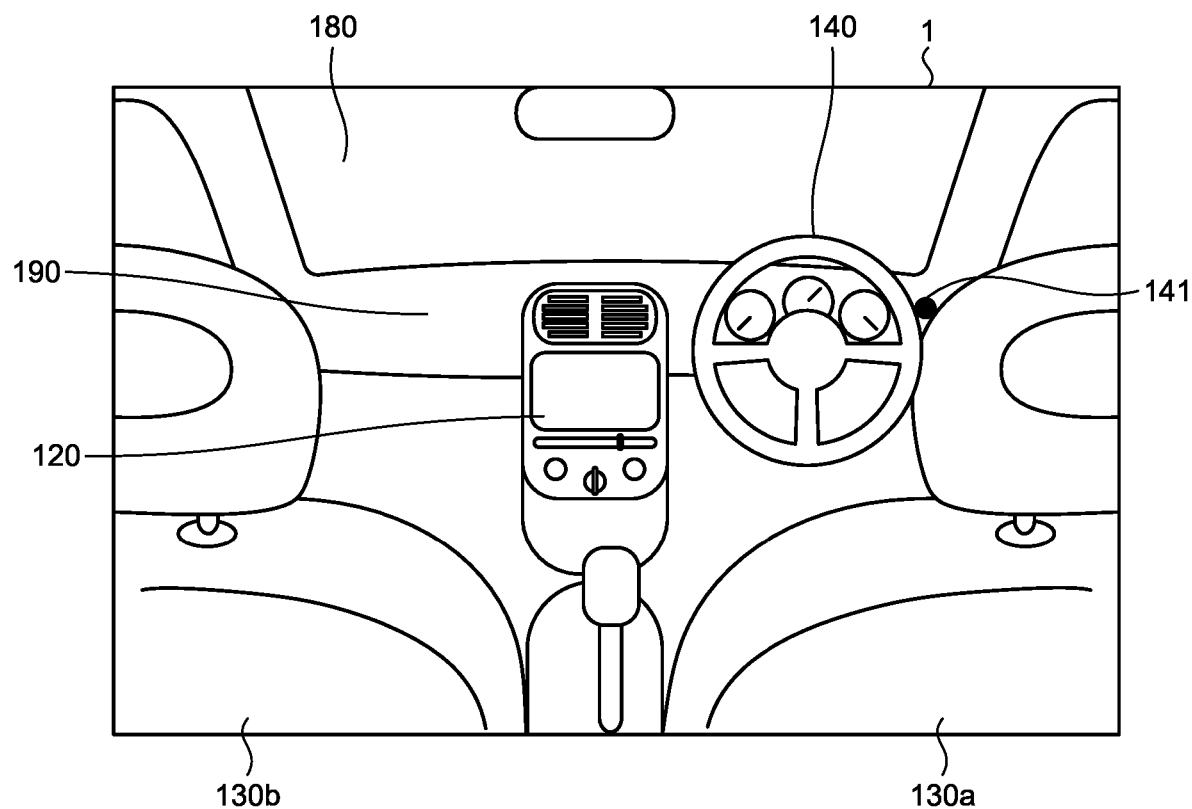
FIG. 2 is a diagram illustrating an example of a configuration in the vicinity of a driver's seat of the vehicle according to the first embodiment.

Next, the following describes a configuration in the vicinity of a driver's seat of the vehicle 1 according to the present embodiment. FIG. 2 is a diagram illustrating an example of the configuration in the vicinity of a driver's seat 130a of the vehicle 1 according to the first embodiment.

As illustrated in FIG. 2, the vehicle 1 includes the driver's seat 130a and a passenger seat 130b. A windshield 180, a dashboard 190, a steering wheel 140, a display device 120, and an operation button 141 are disposed in front of the driver's seat 130a.

The display device 120 is a display disposed on the dashboard 190 of the vehicle 1. By way of example, the display device 120 is positioned at the center of the dashboard 190 as illustrated in FIG. 2. For example, the display device 120 is a liquid crystal display or an organic Electro Luminescence (EL) display. The display device 120 may also serve as a touch panel.

The windshield 180 serves as a head-up display that can display an image when a projection device (not illustrated) projects the image thereon. The display device 120 and the head-up display are examples of a display unit in the present embodiment.

The steering wheel 140 is disposed in front of the driver's seat 130*a*, and can be operated by a driver. A rotation angle, that is, a steering angle of the steering wheel 140 is electrically or mechanically linked to change in orientation of the front tire 13*f* as a steered wheel. The steered wheel may be the rear tire 13*r*, or both of the front tire 13*f* and the rear tire 13*r* may be steered wheels.

The operation button 141 is a button that can receive an operation performed by a user. In the present embodiment, the user is the driver of the vehicle 1, for example. By receiving a press-down operation from the driver, the operation button 141 receives an operation for starting parking support from the driver, for example. A position of the operation button 141 is not limited to the example illustrated in FIG. 2, but the operation button 141 may be disposed on the steering wheel 140, for example. The operation button 141 is an example of the operation part in the present embodiment. In a case in which the display device 120 also serves as a touch panel, the display device 120 may be an example of the operation part. An example of the operation part may be an operation terminal that can transmit a signal to the vehicle 1 from the outside of the vehicle 1 such as a remote controller or an electronic key (not illustrated).

Next, the following describes a function provided in the vehicle 1 according to the present embodiment. The vehicle 1 according to the present embodiment learns a traveling route based on teacher traveling performed by the driver, and performs parking support by using a learning result thereof. In other words, the parking support method performed by the parking support device 100 mounted on the vehicle 1 according to the present embodiment is a method of performing automatic traveling of the vehicle 1 based on teacher traveling performed by the driver. Such a parking support method is effective for reducing time and effort of the driver for parking in a case of repeatedly performing parking at a determined parking position such as a garage of a driver's house, a contracted parking position of collective housing, or a prescribed parking position in a parking lot of a driver's office, for example. Thus, such parking support is called home zone parking or route memory type automatic parking. Teacher traveling is an example of a parking operation performed in the past in the present embodiment.

Figure 3:
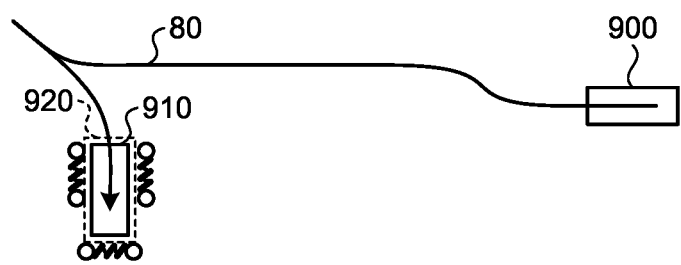
FIG. 3 is a diagram for explaining an example of parking support according to the first embodiment.

FIG. 3 is a diagram for explaining an example of parking support according to the first embodiment. A traveling route 80 illustrated in FIG. 3 is a route along which the vehicle 1 moves from a traveling start position 900 to a parking position 910.

The parking position 910 is, for example, positioned in a garage 920 of a house of the driver of the vehicle 1, but the embodiment is not limited thereto.

The parking support device 100 according to the present embodiment performs home zone parking for parking the vehicle 1 at the parking position 910 based on learning of the traveling route 80 and the learned traveling route 80.

Figure 4:
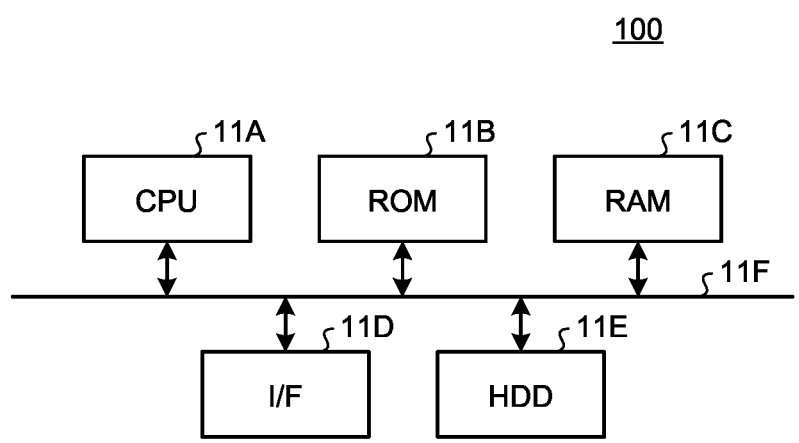
FIG. 4 is a diagram illustrating an example of a hardware configuration of the parking support device according to the first embodiment.

Next, the following describes a hardware configuration of the parking support device 100. FIG. 4 is a diagram illustrating an example of the hardware configuration of the parking support device 100 according to the first embodiment. As illustrated in FIG. 4, the parking support device 100 has the hardware configuration in which a central processing unit (CPU) 11A, a read only memory (ROM) 11B, a random access memory (RAM) 11C, an interface (I/F) 11D, a hard disk drive (HDD) 11E, and the like are connected to each other via a bus 11F, the hardware configuration implemented by a normal computer.

The CPU 11A is an arithmetic device that controls the entire ECU. The CPU 11A is an example of a processor in the parking support device 100 according to the present embodiment, and another processor or processing circuit may be disposed in place of the CPU 11A. The ROM 11B stores a computer program or the like that implement various kinds of processing performed by the CPU 11A. The RAM 11C is a main storage device of the parking support device 100, for example, and stores data required for various kinds of processing performed by the CPU 11A. The I/F 11D is an interface for transmitting or receiving data. The I/F 11D may also transmit/receive information to/from another ECU mounted on the vehicle 1 via a controller area network (CAN) or the like in the vehicle 1.

Figure 5:
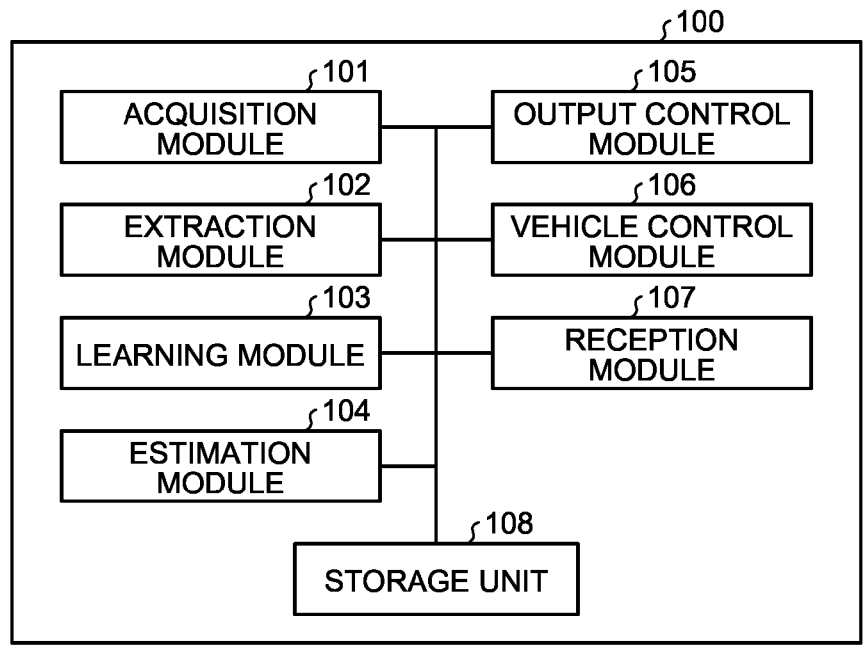
FIG. 5 is a block diagram illustrating an example of functions provided in the parking support device according to the first embodiment.

Next, the following describes details about functions of the parking support device 100 according to the present embodiment. FIG. 5 is a block diagram illustrating an example of the functions provided in the parking support device 100 according to the first embodiment.

As illustrated in FIG. 5, the parking support device 100 according to the present embodiment includes an acquisition module 101, an extraction module 102, a learning module 103, an estimation module 104, an output control module 105, a vehicle control module 106, a reception module 107, and a storage unit 108.

The storage unit 108 is, for example, constituted of the ROM 11B, the RAM 11C, or the HDD 11E. In FIG. 5, the one storage unit 108 is assumed to be included in the parking support device 100, but a plurality of storage media may function as storage units 108.

The storage unit 108 stores a computer program and data used in various kinds of processing performed by the parking support device 100. For example, a computer program executed by the parking support device 100 according to the present embodiment has a module configuration including each of the functional parts described above (the acquisition module 101, the extraction module 102, the learning module 103, the estimation module 104, the output control module 105, the vehicle control module 106, and the reception module 107). As actual hardware, each of the parts described above are loaded onto the RAM 11C when the CPU 11A reads out, from the storage unit 108, and performs the computer program, and the acquisition module 101, the extraction module 102, the learning module 103, the estimation module 104, the output control module 105, the vehicle control module 106, and the reception module 107 are generated on the RAM 11C. Processing implemented by each of the functional parts of the parking support device 100 is also referred to as a step.

The computer program executed by the parking support device 100 according to the present embodiment is recorded and provided in a computer-readable recording medium such as a CD-ROM, a flexible disk (FD), a CD-R, and a digital versatile disc (DVD), as an installable or executable file.

The computer program executed by the parking support device 100 according to the present embodiment may be configured to be stored in a computer connected to a network such as the Internet and provided by being downloaded via the network. Furthermore, the computer program executed by the parking support device 100 according to the present embodiment may be configured to be provided or distributed via a network such as the Internet. The computer program executed by the parking support device 100 according to the present embodiment may be configured to be provided by embedding it into the ROM 11B in advance, for example.

The acquisition module 101 acquires an image obtained by imaging surroundings of the vehicle 1 from the imaging device 16. Hereinafter, this image is referred to as a surrounding image. The acquisition module 101 acquires a plurality of surrounding images at the time when the vehicle 1 learns a traveling route based on teacher traveling, and at the time when the vehicle 1 performs automatic traveling based on the learned traveling route.

The surrounding image obtained by imaging surroundings of the vehicle 1 at the time of traveling of the teacher traveling is an example of first sensor information in the present embodiment.

The surrounding image obtained by imaging surroundings of the vehicle 1 before the vehicle 1 performs automatic traveling based on the learned traveling route or during automatic traveling is an example of second sensor information in the present embodiment.

The acquisition module 101 acquires presence/absence of an obstacle detected by the wave transmission/reception unit 15, and a distance between the vehicle 1 and the obstacle around the vehicle 1 measured by the wave transmission/reception unit 15. Presence/absence of the obstacle detected by the wave transmission/reception unit 15 and the distance between the vehicle 1 and the obstacle around the vehicle 1 measured by the wave transmission/reception unit 15 may also be referred to as environment information related to a surrounding environment of the vehicle 1. The environment information is not limited to such information, but may include the surrounding image, for example.

The acquisition module 101 also acquires vehicle information of the vehicle 1 from various sensors of the vehicle 1 or another ECU. The vehicle information includes, for example, information related to a speed, a steering angle, and a braking operation of the vehicle 1.

The extraction module 102 extracts characteristic points from the surrounding image. A method of extracting characteristic points performed by the extraction module 102 is not limited, and a known method may be applied. For example, the extraction module 102 extracts characteristic points by using a method such as Features from Accelerated Segment Test (FAST) or Oriented FAST and Rotated BRIEF (ORB). At the time of learning the traveling route 80, the extraction module 102 may preferentially record characteristic points satisfying a prescribed condition among the extracted characteristic points. For example, among a plurality of time-series continuous surrounding images, characteristic points extracted from a surrounding image in which a moving distance of the vehicle 1 during imaging is longer may be preferentially selected as the characteristic points.

The learning module 103 causes the storage unit 108 to store information related to the traveling route 80 in teacher traveling. The learning module 103 may also be referred to as a storage processing module or a recording module. More specifically, the learning module 103 learns the traveling route 80 for parking the vehicle 1 at the parking position 910 based on the teacher traveling performed by the driver and the surrounding image that has been taken during the teacher traveling. For example, at the time of learning the traveling route 80, the learning module 103 learns change of the position of the vehicle 1 based on change of the characteristic points extracted from the surrounding images that have been taken during the teacher traveling. The learning module 103 also learns a speed, a steering angle, and a braking operation of the vehicle 1 during the teacher traveling. The learning module 103 also defines, as a map, the surrounding environment of the vehicle 1 based on the characteristic points extracted from the surrounding images that have been taken during the teacher traveling performed by the driver, and causes the storage unit 108 to store the map.

In the present embodiment, learning is assumed to encompass causing the storage unit 108 to store collected pieces of information. A method of causing the storage unit 108 to store the information related to the traveling route 80 and the map described above is not limited to the method exemplified in the present embodiment.

The teacher traveling according to the present embodiment is traveling by which the driver moves the vehicle 1 from the traveling start position 900 outside the parking position to the parking position 910 by manual driving. In the present embodiment, the learning module 103 learns the traveling start position 900 in the teacher traveling as a start position of the traveling route 80. A distance from the traveling start position 900 to the parking position 910 is assumed to be about 50 m, for example, but the embodiment is not limited thereto.

For example, the driver starts teacher traveling from a state in which the vehicle 1 is stopping at a position different from the parking position 910, for example, a desired position outside the garage 920, and causes the vehicle 1 to move backward and travel to the parking position 910 in the garage 920. The teacher traveling is not limited to backward movement, but may be forward movement, or may include both of forward movement and backward movement.

During the teacher traveling, the acquisition module 101 described above acquires the surrounding image and vehicle information. During the teacher traveling, the extraction module 102 described above extracts characteristic points from the surrounding image acquired by the acquisition module 101. The learning module 103 records, as the traveling route 80, a route along which the vehicle 1 travels by manual driving based on the extracted characteristic points and the vehicle information at the time when the surrounding image from which the characteristic points are extracted is taken. Specifically, in a case in which the driver performs teacher traveling for parking the vehicle 1 at the parking position 910 by backward movement, the traveling route 80 becomes a route along which the vehicle 1 is parked at the parking position 910 by backward movement. In the present embodiment, a position where the teacher traveling is started becomes the traveling start position 900 of the traveling route 80. The learning module 103 stores, in the storage unit 108, traveling route information that defines the recorded traveling route 80.

The traveling route information is stored in the storage unit 108 as information obtained by associating a speed, a steering angle, and a braking operation of the vehicle 1 during teacher traveling, and the characteristic points extracted from the surrounding images that are taken along with movement of the vehicle 1 during teacher traveling with each other in time-series. A method of learning the traveling route 80 and an aspect of defining the traveling route are not limited to the example herein.

The estimation module 104 estimates, based on the surrounding image, the position of the vehicle 1, and a position where the vehicle 1 can move to the parking position 910 by automatic driving based on the traveling route 80.

The position where the vehicle 1 can move to the parking position 910 by automatic driving is, in other words, a position where the vehicle 1 can start automatic traveling by home zone parking. Automatic traveling by home zone parking is, that is, automatic traveling based on the traveling route 80 stored in the storage unit 108. The position where the vehicle 1 can move to the parking position 910 by automatic driving is an example of a target position in the present embodiment. The target position is not limited to one position, and may be a region encompassing a range wider than the vehicle body 12 of the vehicle 1. The target position may also be referred to as a target region. In the present embodiment, the target position where the vehicle 1 can move to the parking position 910 is the traveling start position 900. The parking position 910 is a goal of the traveling route by home zone parking, and is also referred to as a final target position.

More specifically, in a case in which the reception module 107 (described later) receives an operation of starting home zone parking performed by the driver, the estimation module 104 reads out, from the storage unit 108, the traveling route 80 and the characteristic points (map) of the surrounding image at the time of learning the traveling route 80. The estimation module 104 then estimates, based on the traveling route 80 and the characteristic points that are extracted from the surrounding image by the extraction module 102, the position of the vehicle 1, and the traveling start position 900 from which the vehicle 1 can move to the parking position 910 by automatic driving based on the traveling route 80.

The estimation module 104 compares the characteristic points in the surrounding image at the time of learning the traveling route 80 with the characteristic points in the surrounding image at the time of receiving the operation of starting home zone parking. The estimation module 104 estimates the position and orientation of the vehicle 1 in the map read out from the storage unit 108 by using the characteristic points in the surrounding image at the time of receiving the operation of starting home zone parking. The estimation module 104 does not necessarily specify the traveling start position 900 and a current position of the vehicle 1 as absolute positions, and may specify a relative positional relation between the traveling start position 900 and the current position of the vehicle 1. A method of estimating the position of the vehicle 1 and the traveling start position 900 by the estimation module 104 is not limited to the example herein.

The estimation module 104 also determines whether the traveling start position 900 is present within a prescribed distance from the vehicle 1 based on the position of the vehicle 1 and the traveling start position 900 that have been estimated. The prescribed distance is, for example, a distance at which the traveling start position 900 is included in an imaging range of the imaging device 16 of the vehicle 1, and a distance at which the traveling start position 900 can be viewed through the windshield 180 of the vehicle 1. By way of example, the prescribed distance is assumed to be about 5 m, but the distance is not limited to that value. The prescribed distance is also referred to as a first prescribed distance.

In a case of determining that the traveling start position 900 is present within the prescribed distance from the vehicle 1, the estimation module 104 sends out, to the output control module 105 (described later), the position of the vehicle 1 and the traveling start position 900 that have been estimated. Alternatively, the output control module 105 may determine whether the traveling start position 900 is present within the prescribed distance from the vehicle 1.

While the vehicle 1 performs automatic traveling by the vehicle control module 106 (described later), the estimation module 104 estimates the position of the vehicle 1 based on the characteristic points included in the traveling route information and the characteristic points extracted from the surrounding image that has been acquired during automatic traveling. The estimation module 104 sends out the estimated position of the vehicle 1 to the vehicle control module 106.

Estimation processing for the position of the vehicle 1 by the estimation module 104 may be continuously performed during traveling of the vehicle 1, or may be started after the operation of starting home zone parking by the user. For example, in a case in which the estimation processing is performed outside a range of the map stored by the teacher traveling, the estimation module 104 cannot specify the position of the vehicle 1. However, in a case in which the vehicle 1 reaches the range of the map, the estimation module 104 may notify the output control module 105 that the vehicle 1 is positioned near the traveling start position 900. In a case in which the current position of the vehicle 1 is the traveling start position 900, the estimation module 104 may notify the output control module 105 that the vehicle 1 is positioned at the traveling start position 900. The estimation module 104 may determine that the vehicle 1 is positioned at the traveling start position 900 not only in a case in which the current position of the vehicle 1 completely matches the traveling start position 900 but also in a case in which a distance between the current position of the vehicle 1 and the traveling start position 900 is a prescribed error or less.

The output control module 105 causes the head-up display or the display device 120 to display guidance information related to the position where the vehicle 1 can move to the parking position 910 by automatic driving.

The guidance information is information including the position where automatic traveling of the vehicle 1 based on the traveling route can be performed, and the orientation of the vehicle 1 with which automatic traveling of the vehicle 1 can be performed in a case in which the vehicle is positioned at the position. In the present embodiment, the guidance information is an image indicating the traveling start position 900. In the present embodiment, this image is referred to as a guidance image.

For example, in a case in which the estimation module 104 estimates that the vehicle 1 reaches the range of the map stored by teacher traveling, the output control module 105 suggests starting home zone parking to the user. A method of suggestion is not limited. The output control module 105 may cause the display device 120 to display a message for prompting start of home zone parking, or may cause the speaker of the vehicle 1 to output the message by voice.

Alternatively, a configuration may be employed in which the user performs an operation of starting home zone parking at an optional timing without making such a notification. For example, it is assumed that the user desires to travel the vehicle 1 to the vicinity of his/her house by manual driving, and park the vehicle 1 in the garage 920 of his/her house by home zone parking thereafter. In this case, the user performs the operation of starting home zone parking by pressing down the operation button 141, for example.

When the user moves the vehicle 1 to the traveling start position 900 that has been previously learned by the vehicle 1 by manual driving, and performs the operation of starting automatic traveling thereafter by pressing down the operation button 141, for example, automatic traveling by the vehicle control module 106 (described later) is started.

Alternatively, a configuration that automatic traveling is automatically started when the user stops the vehicle 1 may be employed.

In a case in which home zone parking is performed by such a procedure, as described above, the user moves the vehicle 1 to the traveling start position 900 by manual traveling. If the vehicle 1 stops at a position different from the traveling start position 900, and a distance between the traveling start position 900 and an actual stopping position of the vehicle 1 falls within a permissible range, correction can be performed by feedback control of the vehicle control module 106 (described later). However, in a case in which the distance between the traveling start position 900 and the actual stopping position of the vehicle 1 is too long such that the distance exceeds the permissible range, it may be difficult that the vehicle 1 moves to the parking position 910 by automatic driving by the vehicle control module 106 in some cases.

Thus, when the output control module 105 causes the head-up display or the display device 120 to display the image indicating the traveling start position 900, the driver can grasp the traveling start position 900. Thus, the driver can easily stop the vehicle 1 at the traveling start position 900.

In a case in which the vehicle 1 is positioned at a position where automatic traveling of the vehicle 1 can be performed, the output control module 105 may make a notification to the user. For example, in a case in which the vehicle 1 moves to the traveling start position 900, the output control module 105 notifies the user that the vehicle 1 is positioned at the traveling start position 900, that is, automatic traveling can be started. A method of notification is not limited. The output control module 105 may cause the head-up display or the display device 120 to display a message representing that the vehicle 1 is positioned at the traveling start position 900. Alternatively, the output control module 105 may cause the speaker of the vehicle 1 to output the message by voice.

Figure 6:
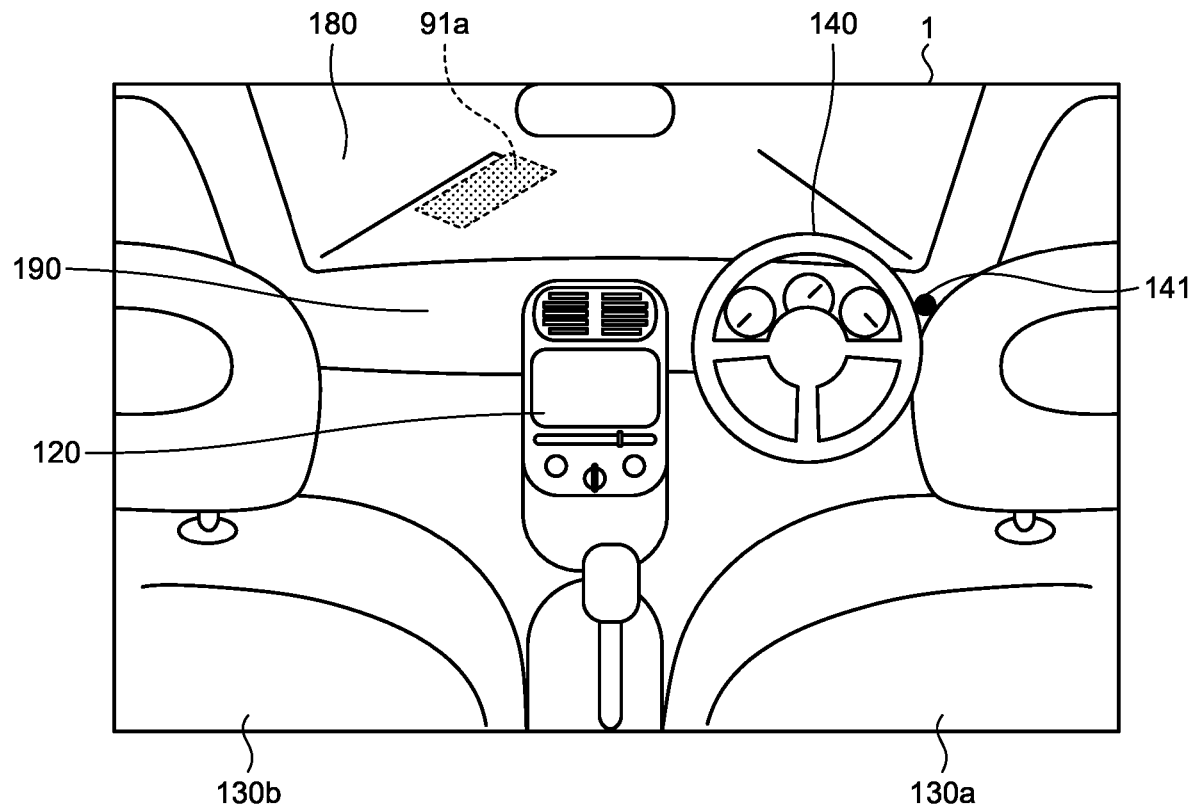
FIG. 6 is a diagram illustrating an example of an image indicating a traveling start position displayed on a head-up display according to the first embodiment.

FIG. 6 is a diagram illustrating an example of an image indicating the traveling start position 900 displayed on the head-up display according to the first embodiment. As illustrated in FIG. 6, the output control module 105 causes a first guidance image 91a indicating the traveling start position 900 to be displayed on the windshield 180 functioning as the head-up display.

In the example illustrated in FIG. 6, the first guidance image 91a is a rectangular figure representing a size corresponding to the vehicle body of the vehicle 1. Orientation of the rectangle as the first guidance image 91a represents orientation of the vehicle 1 for enabling automatic traveling at the traveling start position 900. In FIG. 6, the first guidance image 91a is a rectangle surrounded by a dashed line. However, the first guidance image 91a may be a figure surrounded by a solid line instead of the dashed line, for example. The first guidance image 91a may be an image in which a contour line in a longitudinal direction is thicker than a contour line in a lateral direction like a second guidance image, which is described later with reference to FIG. 7. In FIG. 6, display on the display device 120 is omitted.

The output control module 105 causes the second guidance image indicating the traveling start position to be displayed on a front view or a top view displayed on the display device 120.

Figure 7:
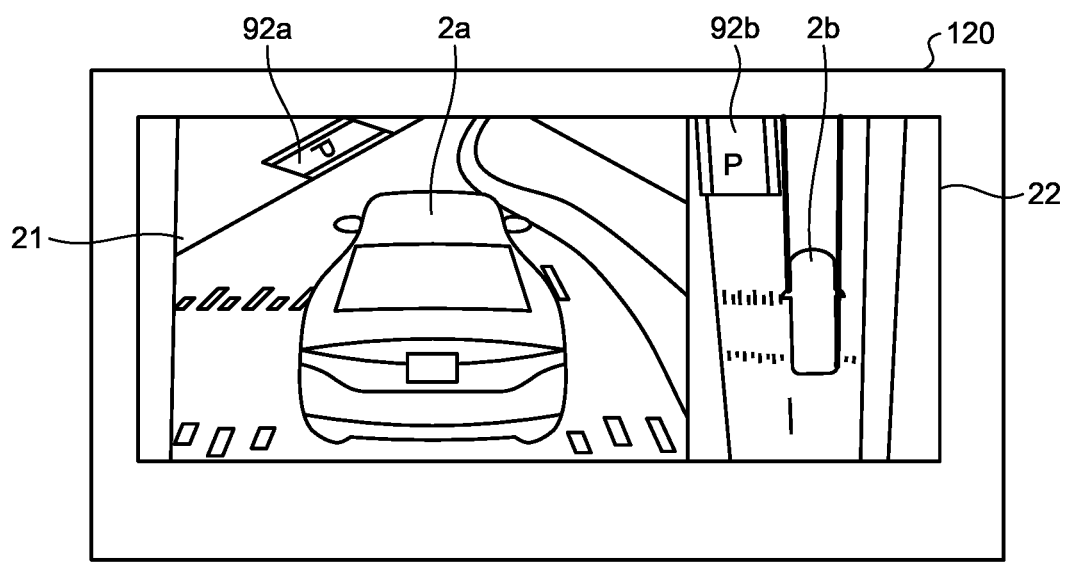
FIG. 7 is a diagram illustrating an example of an image indicating a traveling start position displayed on a display device according to the first embodiment.

FIG. 7 is a diagram illustrating an example of an image indicating the traveling start position 900 displayed on the display device 120 according to the first embodiment. As illustrated in FIG. 7, the output control module 105 causes a second guidance image 92a to be displayed on a front view 21 representing a front direction of the vehicle 1. In the example illustrated in FIG. 7, the front view 21 includes a first vehicle image 2a representing the position of the vehicle body 12 of the vehicle 1. The output control module 105 causes a second guidance image 92b to be displayed on a top view 22 representing a state of the vehicle 1 viewed from an upper side. The top view 22 includes a second vehicle image 2b representing the position of the vehicle body 12 of the vehicle 1.

In the example illustrated in FIG. 7, each of the second guidance images 92a and 92b is a rectangular figure representing a size corresponding to the vehicle body of the vehicle 1. In the example illustrated in FIG. 7, the contour line in the longitudinal direction of each of the second guidance images 92a and 92b is thinner than the contour line in the lateral direction thereof.

In the present embodiment, both images displayed on the front view 21 and the top view 22 are assumed to be the second guidance images, but the image on the top view 22 may be referred to as a third image. In FIG. 7, the output control module 105 causes the second guidance images 92a and 92b to be displayed on both of the front view 21 and the top view 22, but may cause the second guidance images 92a and 92b to be displayed on any one of the front view 21 and the top view 22. Regarding the front view 21 illustrated in FIG. 7, the first vehicle image 2a representing the vehicle body 12 of the vehicle 1 is depicted in the front view 21, but the front view 21 does not necessarily include the vehicle body 12 of the vehicle 1.

In FIG. 7, the output control module 105 causes a character "P" to be displayed on the second guidance images 92a and 92b in order to make the driver recognize that the vehicle should be stopped at the traveling start position 900, but the character is not necessarily displayed. Alternatively, the output control module 105 may cause a sentence representing an instruction to the driver such as "stop here" to be displayed on the second guidance images 92a and 92b or in the vicinity of the second guidance images 92a and 92b. The output control module 105 may also cause the character "P" or a sentence representing an instruction to the driver to be displayed on the first guidance image 91a or in the vicinity of the first guidance image 91a on the head-up display.

In the present embodiment, the output control module 105 causes the guidance information to be displayed on both of the head-up display and the display device 120. However, the output control module 105 may cause the guidance information to be displayed on any one of the head-up display and the display device 120.

Returning to FIG. 5, the vehicle control module 106 moves the vehicle 1 to the parking position 910 by automatic driving based on the traveling route 80. The vehicle control module 106 causes the vehicle 1 to automatically travel by controlling steering, braking, and acceleration/deceleration of the vehicle 1. In the present embodiment, the vehicle control module 106 causes the vehicle 1 to automatically travel along the learned traveling route 80. Such a method of traveling control is also called "reproducing the traveling route 80".

During automatic traveling, the vehicle control module 106 may cause the vehicle 1 to operate differently from the teacher traveling based on the environment information and the vehicle information of the vehicle 1 acquired by the acquisition module 101. As described above, the environment information includes presence/absence of an obstacle around the vehicle 1, and a distance between the vehicle 1 and the obstacle around the vehicle 1. For example, in a case in which an obstacle such as another vehicle approaches the vehicle 1 during automatic driving, the vehicle control module 106 performs control for stopping the vehicle 1, for example.

In the present embodiment, during automatic traveling performed by the vehicle control module 106, the driver may be seated on the driver's seat 130a of the vehicle 1, or may get off the vehicle 1.

In a case in which the vehicle 1 deviates from the traveling route 80, the vehicle control module 106 causes the vehicle 1 to move so that it returns to the traveling route 80 by feedback control. For example, the vehicle control module 106 estimates a difference between the position of the vehicle 1 and the traveling route 80 based on the position of the vehicle 1 estimated by the estimation module 104, and causes the vehicle 1 to travel to reduce the difference.

In FIG. 5, the parking support device 100 is illustrated as including the vehicle control module 106, but the vehicle control module 106 may be implemented by another ECU external to the parking support device 100.

The reception module 107 receives various operations from the driver. For example, the reception module 107 receives an operation of starting parking support in a case in which the operation button 141 is pressed down. In a case in which the display device 120 is a touch panel, the reception module 107 may receive an operation for starting parking support when an image button on the touch panel is pressed down.

Next, the following describes a procedure of parking support processing performed by the parking support device 100 according to the present embodiment configured as described above.

Figure 8:
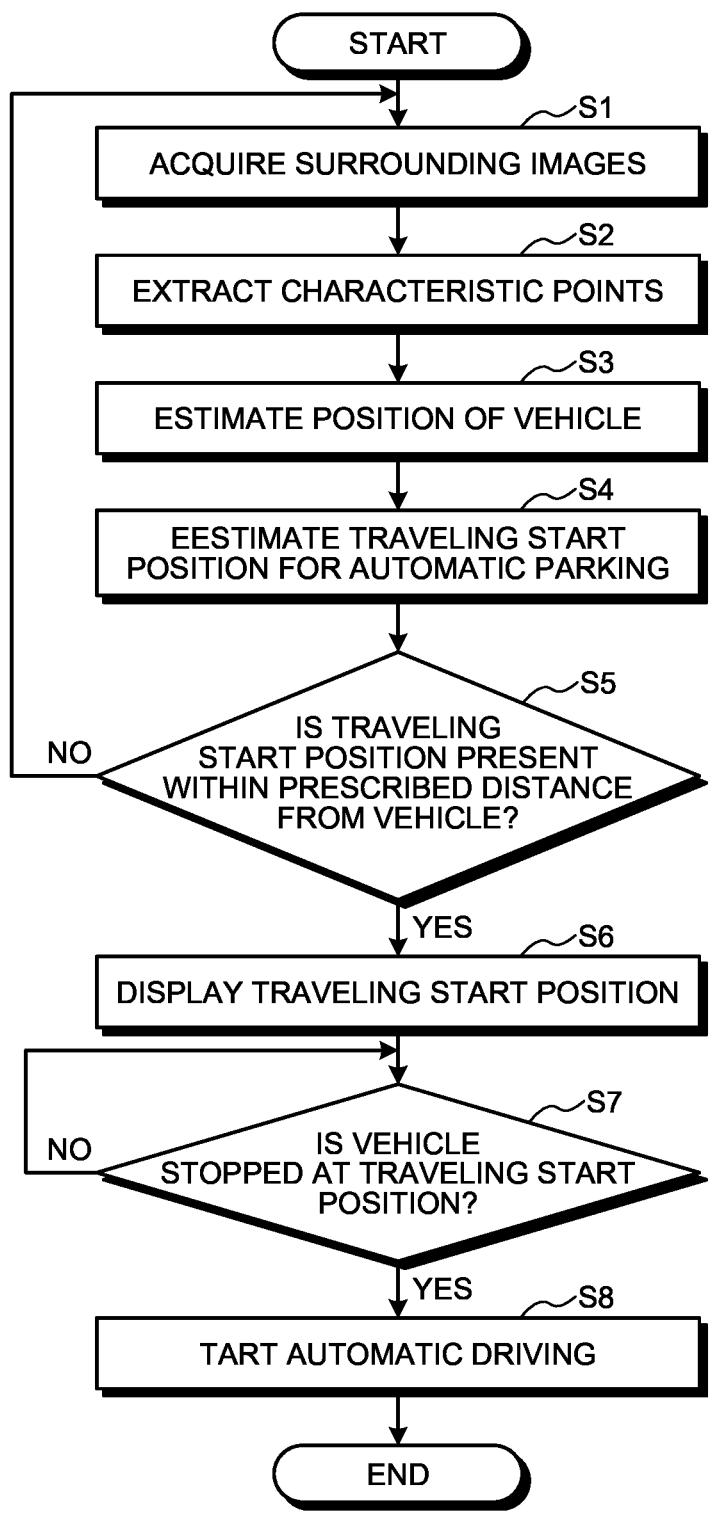
FIG. 8 is a flowchart illustrating an example of a procedure of parking support processing performed by the parking support device according to the first embodiment.

FIG. 8 is a flowchart illustrating an example of the procedure of parking support processing performed by the parking support device 100 according to the first embodiment. The processing in this flowchart is, for example, started when the reception module 107 receives the operation of starting parking support. It is assumed that the traveling route 80 is learned by the learning module 103 before the processing in the flowchart is performed.

First, the acquisition module 101 acquires the surrounding images from the imaging device 16 (S1).

The extraction module 102 then extracts the characteristic points from the surrounding image acquired by the acquisition module 101 (S2).

Next, the estimation module 104 reads out traveling route information from the storage unit 108, and estimates the position of the vehicle 1 based on the traveling route 80 defined by the traveling route information and the characteristic points that are extracted from the surrounding image by the extraction module 102 (S3).

The estimation module 104 estimates the traveling start position 900 for automatic parking based on the traveling route 80 and the characteristic points that are extracted from the surrounding image by the extraction module 102 (S4).

The estimation module 104 then determines whether the traveling start position 900 is present within a prescribed distance from the vehicle 1 based on the position of the vehicle 1 and the traveling start position 900 that have been estimated (S5).

If the estimation module 104 determines that the traveling start position 900 is not present within the prescribed distance from the vehicle 1 (No at S5), the process returns to S1.

For example, in a case in which the vehicle 1 is present at a position more distant from the traveling start position 900 than the prescribed distance, the output control module 105 cannot cause the traveling start position 900 to be displayed on the head-up display or the display device 120. Thus, in such a case, the estimation module 104 repeatedly performs pieces of processing at S1 to S5, and stands by until the vehicle 1 approaches the traveling start position 900. Also in a case in which the characteristic points extracted from the surrounding image in the processing at S2 do not match the characteristic points extracted at the time of learning the traveling route 80 at all, the estimation module 104 determines that the traveling start position 900 is not present within the prescribed distance from the vehicle 1.

If the estimation module 104 determines that the traveling start position 900 is present within the prescribed distance from the vehicle 1 (Yes at S5), the output control module 105 displays the traveling start position 900.

Specifically, the output control module 105 causes the first guidance image 91a indicating the traveling start position 900 to be displayed on the windshield 180 functioning as the head-up display. The output control module 105 also causes the second guidance images 92a and 92b indicating the traveling start position 900 to be displayed on the front view 21 and the top view 22 displayed on the display device 120 (S6). Due to this display, the driver can grasp the traveling start position 900, and can move the vehicle 1 to the traveling start position 900 by manual driving.

While the vehicle 1 is moving to the traveling start position 900, the acquisition module 101 continuously acquires surrounding images from the imaging device 16. The extraction module 102 extracts the characteristic points from the acquired surrounding images. The acquisition module 101 acquires the vehicle information, presence/absence of an obstacle around the vehicle 1, and a distance to the obstacle. The estimation module 104 estimates the position of the vehicle 1 that is changed along with traveling of the vehicle 1 based on the vehicle information or movement of the characteristic points extracted from the surrounding image. The output control module 105 moves positions of the first guidance image 91a and the second guidance images 92a and 92b along with movement of the vehicle 1.

The vehicle control module 106 then determines whether the vehicle 1 has stopped at the traveling start position 900 (S7). The determination processing may be performed by the estimation module 104. If the vehicle 1 has not reached the traveling start position 900 (No at S7), the vehicle control module 106 stands by until the vehicle 1 reaches and stops at the traveling start position 900.

If the vehicle 1 reaches and stops at the traveling start position 900 (Yes at S7), the vehicle control module 106 starts automatic driving (S8). The vehicle control module 106 then causes the vehicle 1 to travel from the traveling start position 900 to the parking position 910 along the traveling route 80 by automatic driving. At this point, the processing in this flowchart ends. At S7 and S8, it is assumed that automatic driving is started when the vehicle 1 reaches and stops at the traveling start position 900, but automatic driving may be started in a case of receiving an operation of starting automatic driving from the user after the vehicle 1 reaches and stops at the traveling start position 900.

A condition for starting automatic driving is not limited thereto. Automatic driving may be started when the vehicle 1 has stopped at the traveling start position 900 and the driver performs a starting operation with the operation button 141 or the touch panel. Alternatively, automatic driving may be started when the driver gets off the vehicle 1 after stopping the vehicle 1 at the traveling start position 900, and performs the starting operation from the outside of the vehicle 1 via an operation terminal such as a remote controller or an electronic key.

In this way, in the parking support method performed by the parking support device 100 according to the present embodiment, the storage unit 108 is caused to store information related to the traveling route 80 of teacher traveling, and the head-up display or the display device 120 is caused to display the guidance information related to the target position where automatic traveling of the vehicle 1 based on the stored traveling route 80 can be performed. Thus, with the parking support method performed by the parking support device 100 according to the present embodiment, the driver can easily grasp the position where automatic driving of the vehicle 1 based on the traveling route 80 is enabled.

In the parking support method performed by the parking support device 100 according to the present embodiment, the traveling route 80 for parking the vehicle 1 at the parking position 910 is stored based on the surrounding image that is taken at the time of teacher traveling performed by the driver. The target position in the present embodiment is a position where the vehicle 1 can move to the parking position 910 by automatic traveling. In the parking support method according to the present embodiment, the position of the vehicle 1 and the target position where the vehicle 1 can move to the parking position 910 by automatic driving based on the traveling route 80 are estimated based on the second sensor information obtained by acquiring the surroundings of the vehicle 1. Thus, with the parking method performed by the parking support device 100 according to the present embodiment, the driver can easily grasp the position where the vehicle 1 can move to the parking position 910 by automatic driving based on the traveling route 80.

The guidance information in the parking support method performed by the parking support device 100 according to the present embodiment, displayed on the head-up display or the display device 120, includes the target position, and the orientation of the vehicle 1 for enabling automatic traveling of the vehicle 1 in a case in which the vehicle 1 is positioned at the target position. Thus, with the parking method performed by the parking support device 100 according to the present embodiment, the driver can also easily grasp a direction in which the vehicle 1 should be oriented at the time of moving the vehicle 1 to the target position.

In the parking support method performed by the parking support device 100 according to the present embodiment, the head-up display or the display device 120 is caused to display the traveling start position 900 of the traveling route 80 as the position where the vehicle 1 can move to the parking position 910. Thus, with the parking support method performed by the parking support device 100 according to the present embodiment, the driver can easily visually recognize the display and manually drive the vehicle 1 to the traveling start position 900.

In the parking support method performed by the parking support device 100 according to the present embodiment, the first guidance image 91a indicating the traveling start position 900 is displayed on the head-up display. Thus, with the parking support method performed by the parking support device 100 according to the present embodiment, the driver can grasp the traveling start position 900 in a state of facing forward.

In the parking support method performed by the parking support device 100 according to the present embodiment, the second guidance images 92a and 92b indicating the traveling start position 900 are displayed on the front view 21 or the top view 22 displayed on the display device 120 disposed on the dashboard 190 of the vehicle 1. Thus, with the parking support method performed by the parking support device 100 according to the present embodiment, the driver can easily grasp a positional relation between the vehicle 1 and the traveling start position 900.

As described above, in the parking support method performed by the parking support device 100 according to the present embodiment, the user may be notified that automatic traveling can be started in a case in which the vehicle 1 is positioned at the target position. With such a notification, the user can easily grasp that the vehicle 1 has reached the position where automatic traveling can be started.

Second Embodiment

In the first embodiment described above, the parking support device 100 displays the traveling start position 900 of the learned traveling route 80. On the other hand, in a second embodiment, the parking support device 100 displays a region in which the vehicle 1 can merge into the traveling route 80 in the middle thereof.

A configuration of the vehicle 1 according to the present embodiment is the same as the configuration according to the first embodiment described above with reference to FIG. 1 and FIG. 2. A hardware configuration and functional blocks of the parking support device 100 according to the present embodiment are the same as those in the first embodiment described above with reference to FIG. 4 and FIG. 5. Similarly to the first embodiment, the parking support device 100 according to the present embodiment includes the acquisition module 101, the extraction module 102, the learning module 103, the estimation module 104, the output control module 105, the vehicle control module 106, the reception module 107, and the storage unit 108.

The acquisition module 101, the extraction module 102, the learning module 103, and the reception module 107 according to the present embodiment have the same functions as those in the first embodiment.

In addition to the function according to the first embodiment, the estimation module 104 according to the present embodiment estimates the position of the vehicle 1 and the region in which the vehicle 1 can merge into the learned traveling route 80 in the middle thereof based on the surrounding image obtained by imaging surroundings of the vehicle 1. More specifically, the estimation module 104 estimates a range in which the vehicle 1 can be returned to the traveling route 80 to reach the parking position 910 by feedback control performed by the vehicle control module 106.

Figure 9:
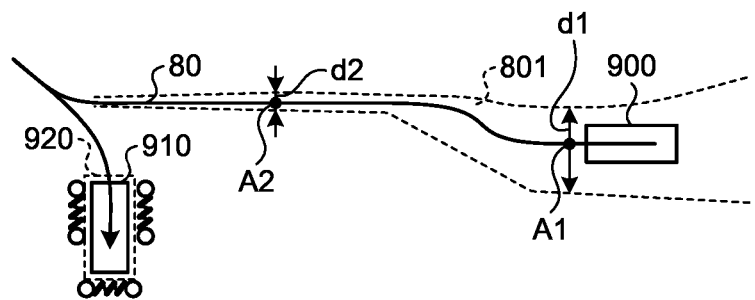
FIG. 9 is a diagram for explaining an example of parking support according to a second embodiment.

FIG. 9 is a diagram for explaining an example of parking support according to the second embodiment. A belt-shaped region 801 along the traveling route 80 illustrated in FIG. 9 is the range in which the vehicle 1 is estimated to be able to merge into the learned traveling route 80 in the middle thereof. In a case in which the vehicle 1 is positioned in the region 801, the vehicle 1 can be returned to the traveling route 80 to be moved to the parking position 910 by feedback control performed by the vehicle control module 106. In other words, the region 801 is a position where the vehicle 1 can start automatic traveling by home zone parking. In the present embodiment, the region 801 is referred to as the parking start region 801 in which parking can be started.

A width of the parking start region 801 becomes narrower as a road distance to the parking position 910 is shorter. For example, in the example illustrated in FIG. 9, a width d2 of the parking start region 801 at a point A2 closer to the parking position 910 is narrower than a width d1 of the parking start region 801 at a point A1 closer to the traveling start position 900. The region 801 disappears as the road distance to the parking position 910 is further reduced. This is because it is difficult to return the vehicle 1 to the traveling route 80 when the parking position 910 as a goal of the traveling route 80 is too close. A position where the parking start region 801 disappears varies depending on a road condition, a size of a space, and the like around the traveling route 80, for example. The width of the parking start region 801 may be determined in advance in association with the road distance from the parking position 910.

In addition to the function according to the first embodiment, the output control module 105 causes the head-up display or the display device 120 to display guidance information related to the parking start region 801.

Figure 10:
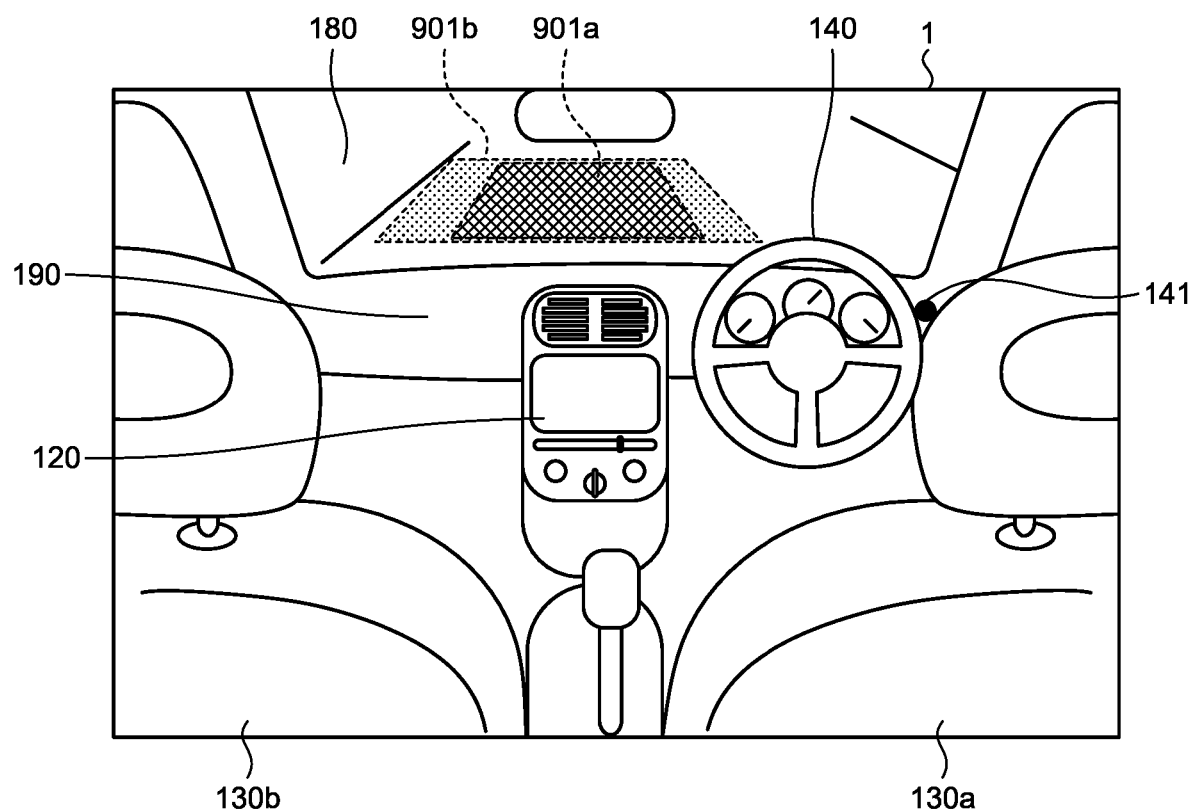
FIG. 10 is a diagram illustrating an example of guidance information related to a parking start region according to the second embodiment.

FIG. 10 is a diagram illustrating an example of the guidance information related to the parking start region 801 according to the second embodiment. In the example illustrated in FIG. 10, the head-up display is caused to display a route guidance image 901a indicating the traveling route 80 and a region guidance image 901b indicating the parking start region 801. The route guidance image 901a and the region guidance image 901b are examples of the guidance information according to the present embodiment. Alternatively, only the region guidance image 901b may be assumed to be an example of the guidance information.

In the example illustrated in FIG. 10, for example, displayed is the region guidance image 901b corresponding to the parking start region 801 in the vicinity of the point A1 described above with reference to FIG. 9. The width of the region guidance image 901b becomes narrower as the road distance to the parking position 910 is getting closer.

Figure 11:
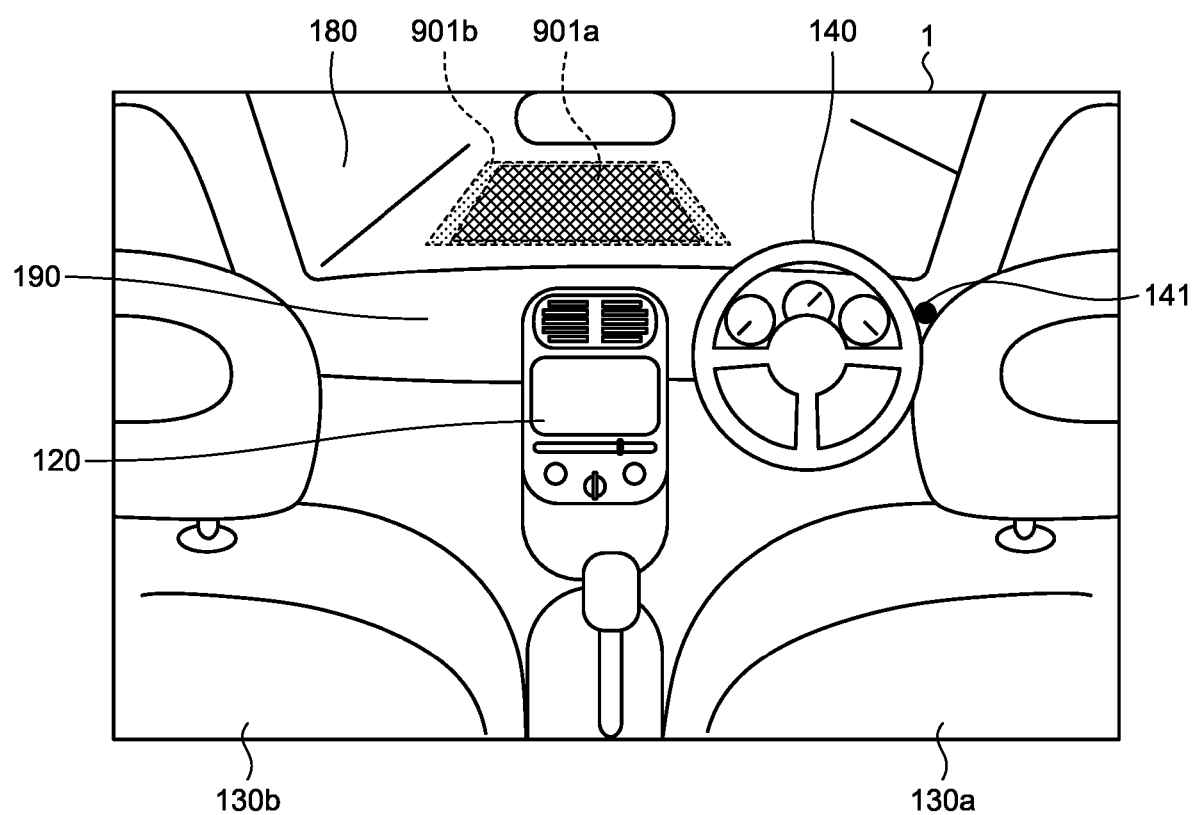
FIG. 11 is a diagram illustrating another example of the guidance information related to the parking start region according to the second embodiment.

FIG. 11 is a diagram illustrating another example of the guidance information related to the parking start region 801 according to the second embodiment. In the example illustrated in FIG. 11, for example, displayed is the region guidance image 901b corresponding to the parking start region 801 in the vicinity of the point A2 described above with reference to FIG. 9. The width d2 of the parking start region 801 at the point A2 is smaller than the width d1 of the parking start region 801 at the point A1, so that the width of the region guidance image 901b displayed on the head-up display illustrated in FIG. 11 is smaller than the width of the region guidance image 901b illustrated in FIG. 10.

A display mode of the region guidance image 901b is not limited to the example illustrated in FIG. 10. For example, the output control module 105 does not necessarily distinguish between the traveling route 80 and the parking start region 801 to be displayed. In this case, the output control module 105 displays only the region guidance image 901b without displaying the route guidance image 901a. Alternatively, the output control module 105 may display the region guidance image 901b on the front view 21 or the top view 22 displayed on the display device 120.

In addition to the function according to the first embodiment, the vehicle control module 106 performs automatic driving control for causing the vehicle 1, which has stopped in the parking start region 801, to move to merge into the traveling route 80 and to be parked at the parking position 910.

The present embodiment exemplifies a case of displaying the route guidance image 901a and the region guidance image 901b. Additionally, similarly to the first embodiment, the first guidance image 91a or the second guidance images 92a and 92b indicating the traveling start position 900 may also be displayed.

Next, the following describes a procedure of parking support processing performed by the parking support device 100 according to the present embodiment configured as described above.

Figure 12:
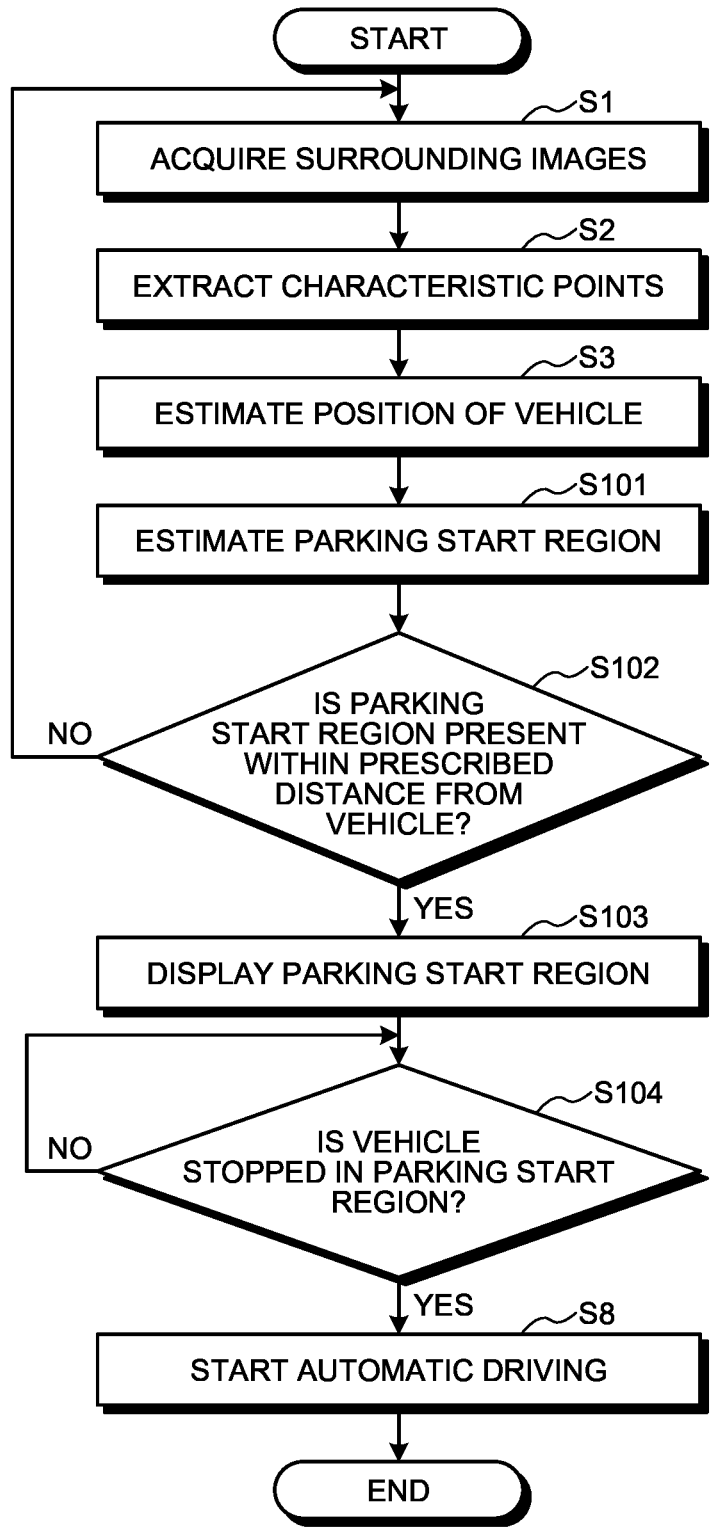
FIG. 12 is a flowchart illustrating an example of a procedure of parking support processing performed by a parking support device according to the second embodiment.

FIG. 12 is a flowchart illustrating an example of the procedure of parking support processing performed by the parking support device 100 according to the second embodiment.

The processing of acquiring the surrounding image at S1 to the processing of estimating the position of the vehicle 1 at S3 are the same as those in the first embodiment. The estimation module 104 then estimates the parking start region 801 (S101).

The estimation module 104 determines whether the parking start region 801 is present within a prescribed distance from the vehicle 1 (S102). The prescribed distance according to the present embodiment is, for example, a distance at which the parking start region 801 is included in an imaging range of the imaging device 16 of the vehicle 1, and a distance at which the parking start region 801 can be viewed through the windshield 180 of the vehicle 1.

If the estimation module 104 determines that the parking start region 801 is not present within the prescribed distance from the vehicle 1 (No at S102), the process returns to S1.

If the estimation module 104 determines that the parking start region 801 is present within the prescribed distance from the vehicle 1 (Yes at S102), the output control module 105 displays the parking start region 801 on the head-up display or the display device 120 (S103). For example, the output control module 105 causes the head-up display or the display device 120 to display the route guidance image 901a and the region guidance image 901b.

The vehicle control module 106 determines whether the vehicle 1 has been stopped in the parking start region 801 (S104). If the vehicle 1 has not reached the parking start region 801 (No at S104), the vehicle control module 106 stands by until the vehicle 1 reaches and stops at the parking start region 801.

If the vehicle 1 reaches and stops at the parking start region 801 (Yes at S104), the vehicle control module 106 starts automatic driving (S8). The vehicle control module 106 performs automatic driving to cause the position of the vehicle 1 to be moved onto the traveling route 80. Thereafter, the vehicle control module 106 causes the vehicle 1 to travel to the parking position 910 along the traveling route 80. At this point, the processing of this flowchart ends.

In this way, in the parking support method performed by the parking support device 100 according to the present embodiment, the traveling route 80 for parking the vehicle 1 at the parking position 910 is learned based on teacher traveling performed by the driver and the surrounding image that is taken at the time of teacher traveling, and the position of the vehicle 1 and the parking start region 801 are estimated thereafter based on the surrounding image that is acquired before parking support is started. In the parking support method, the head-up display or the display device 120 is caused to display the guidance information related to the parking start region 801. Thus, with the parking support method performed by the parking support device 100 according to the present embodiment, in addition to the effect of the first embodiment, the driver can easily be made to grasp the region in which the vehicle can move to the parking position 910 by automatic driving from the middle of the traveling route 80. With the parking support method, the driver can be made to grasp the position where home zone parking can be started in addition to the traveling start position 900 at the time of teacher traveling, and a degree of freedom of a position where the driver stops the vehicle 1 can be improved.

Third Embodiment

In the first and the second embodiments described above, the parking support device 100 estimates the position of the vehicle 1 based on the characteristic points extracted from the surrounding image. In the third embodiment, the parking support device 100 estimates the position of the vehicle 1 by combining other position estimation methods, and supports the driver in accordance with the estimated position.

The vehicle 1 according to the present embodiment has the same configuration as that in the first embodiment described above with reference to FIG. 1 and FIG. 2. The vehicle 1 according to the present embodiment further includes an antenna that can receive Global Positioning System (GPS) signals, and a GPS device that specifies GPS coordinates representing the position of the vehicle 1 based on the received GPS signals. The vehicle 1 also includes a gyro sensor that detects a revolving speed (angular speed) of the vehicle 1, and a sensor that measures the number of revolutions of the wheel 13 of the vehicle 1.

A hardware configuration and functional blocks of the parking support device 100 according to the present embodiment are the same as those in the first embodiment described above with reference to FIG. 4 and FIG. 5. Similarly to the first embodiment, the parking support device 100 according to the present embodiment includes the acquisition module 101, the extraction module 102, the learning module 103, the estimation module 104, the output control module 105, the vehicle control module 106, the reception module 107, and the storage unit 108.

The extraction module 102, the learning module 103, the vehicle control module 106, and the reception module 107 according to the present embodiment have the same functions as those in the first embodiment.

In addition to the function according to the first embodiment, the acquisition module 101 according to the present embodiment acquires position information of the vehicle 1. More specifically, the acquisition module 101 acquires GPS coordinates representing the position of the vehicle 1, that is, GPS position information from the GPS device. The acquisition module 101 also acquires the number of revolutions or an angular speed of the wheel 13 of the vehicle 1 from the gyro sensor and another sensor. The acquisition module 101 may directly acquire these pieces of information from various sensors, or may acquire the pieces of information from another ECU.

In addition to the function according to the first embodiment, the estimation module 104 according to the present embodiment estimates a distance to the parking position 910 from the position of the vehicle 1 based on the position information acquired by the acquisition module 101. The estimation module 104 may estimate the position of the vehicle 1 based not only on the GPS position information but also on a movement amount of the vehicle 1 after a time point at which the GPS position information is acquired. The estimation module 104 may also estimate the movement amount of the vehicle 1 based on the number of revolutions or the angular speed of the wheel 13 of the vehicle 1. For example, after specifying coordinates of a reference point based on the GPS position information, the estimation module 104 may estimate the position of the vehicle 1 after movement by estimating a direction and a distance by which the vehicle 1 moves from the reference point based on the number of revolutions or the angular speed of the wheel 13 of the vehicle 1.

In addition to the function according to the first embodiment, the output control module 105 according to the present embodiment reports to the user that the parking position 910 is close thereto in a case in which a distance from the parking position 910 to the vehicle 1 is a threshold or less. The threshold is not limited, but may be about 20 m, for example. The threshold is also referred to as a second prescribed distance.

Figure 13:
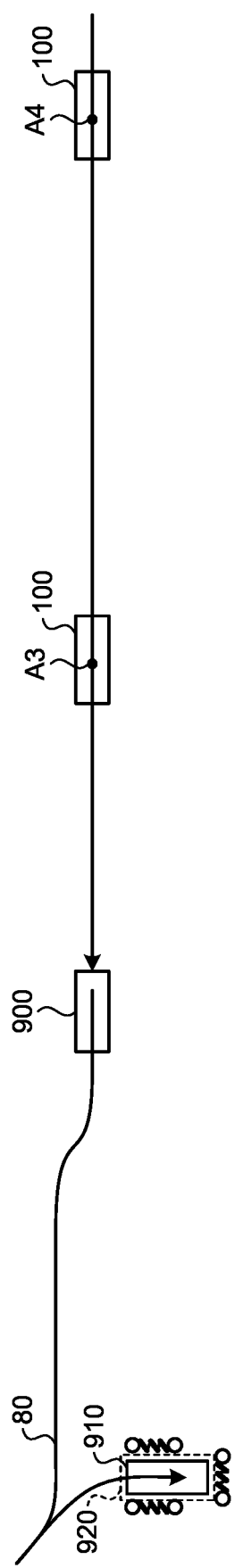
FIG. 13 is a diagram for explaining an example of parking support according to a third embodiment.

FIG. 13 is a diagram for explaining an example of parking support according to the third embodiment. For example, a distance from a point A4 to the parking position 910 illustrated in FIG. 13 is assumed to be the threshold or less. In a case in which the vehicle 1 is positioned at the point A4, the output control module 105 reports to the user that the parking position 910 is close thereto. Content of the report is not limited, but may be a message for prompting parking support to be started such as "Your house is close to here. Should parking support be started?", for example. The output control module 105 may cause the message to be output from the speaker of the vehicle 1 by voice. The output control module 105 may also cause the head-up display or the display device 120 to display the message. For example, in a case of receiving an operation of starting automatic parking toward the parking position 910 from the driver after the report of the message, similarly to the first embodiment or the second embodiment, the estimation module 104 estimates, based on the surrounding image, the position of the vehicle 1, and the position where the vehicle 1 can move to the parking position 910 by automatic driving based on the traveling route 80.

When the vehicle 1 approaches the parking position 910, the estimation module 104 can estimate the position of the vehicle 1 based on the characteristic points extracted from the surrounding image using the same method as that in the first embodiment. For example, in a case in which the vehicle 1 is positioned at the point A3 illustrated in FIG. 13, the estimation module 104 estimates the position of the vehicle 1 based on the characteristic points extracted from the surrounding image. The position where the estimation module 104 can estimate the position of the vehicle 1 based on the characteristic points extracted from the surrounding image is, for example, a position distant from the traveling start position 900 by about 5 m, but the distance is not limited thereto.

Next, the following describes a procedure of parking support processing performed by the parking support device 100 according to the present embodiment configured as described above.

Figure 14:
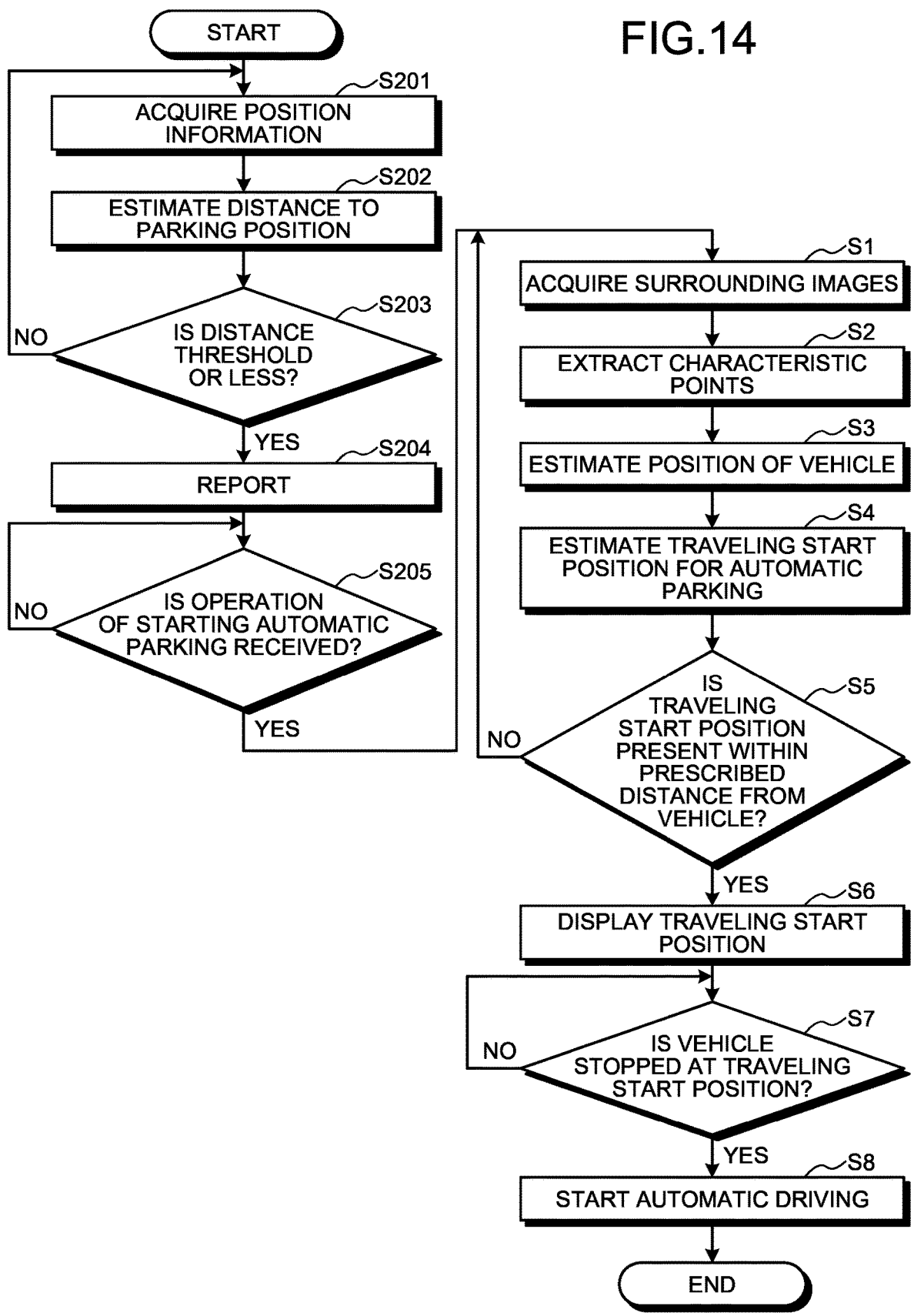
FIG. 14 is a flowchart illustrating an example of a procedure of parking support processing performed by a parking support device according to the third embodiment.

FIG. 14 is a flowchart illustrating an example of the procedure of parking support processing performed by the parking support device 100 according to the third embodiment.

First, the acquisition module 101 acquires position information of the vehicle 1 (S201).

The estimation module 104 then estimates a distance to the parking position 910 from the position of the vehicle 1 based on the acquired position information (S202).

The estimation module 104 determines whether the estimated distance is the threshold or less (S203). The determination processing may be performed by the output control module 105.

If it is determined that the distance estimated by the estimation module 104 is larger than the threshold (No at S203), the process returns to S1.

If it is determined that the distance estimated by the estimation module 104 is the threshold or less (Yes at S203), the output control module 105 reports to the user that the parking position 910 is close thereto (S204).

The reception module 107 determines whether the operation of starting automatic parking is received from the driver (S205). If the operation of starting parking is not received (No at S205), the reception module 107 stands by until the operation is performed by the user while repeating the processing at S205.

If the reception module 107 receives the operation of starting parking (Yes at S205), the process proceeds to the processing of acquiring the surrounding image at S1. The pieces of processing from S1 to S8 are the same as those in the first embodiment described above with reference to FIG. 8. The processing at S1 and the following pieces of processing may be the same as the pieces of processing in the second embodiment described above with reference to FIG. 12.

In this way, in the parking support method performed by the parking support device 100 according to the present embodiment, it is reported to the driver that the parking position 910 is close thereto in a case in which the distance from the position of the vehicle 1 to the parking position 910 is the threshold or less. Due to this, the parking support method according to the present embodiment can cause the driver to easily grasp an appropriate timing for performing operation of starting automatic parking while having the function according to the first embodiment.

First Modification

In the embodiments described above, an example of display on the head-up display and the display device 120 is described, but a display mode of the traveling start position 900 or the parking start region 801 is not limited to the example described above.

Figure 15:
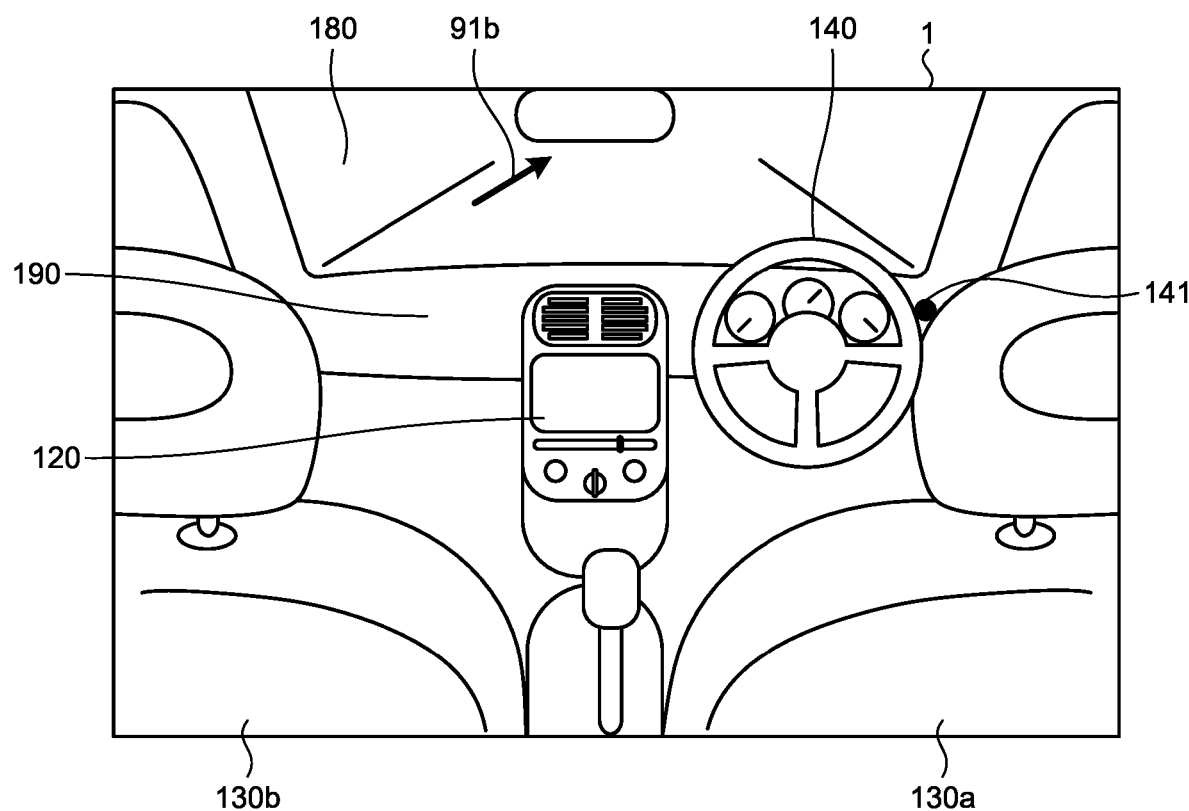
FIG. 15 is a diagram illustrating an example of an image indicating a traveling start position displayed on a head-up display according to a first modification.

FIG. 15 is a diagram illustrating an example of an image indicating the traveling start position 900 displayed on the head-up display according to a first modification. The output control module 105 according to the present modification causes a first guidance image 91*b* indicating the traveling start position to be displayed on the windshield 180 functioning as the head-up display. In the present modification, the first guidance image 91*b* has an arrow shape, and a starting point of the arrow corresponds to the traveling start position. The arrow extends along the traveling route 80. Due to such a display mode, the driver can grasp a direction in which the vehicle 1 travels from the traveling start position by automatic traveling. The guidance image having the arrow shape may be displayed while being superimposed on the front view 21 or the top view 22 on the display device 120.

Second Modification

Figure 16:
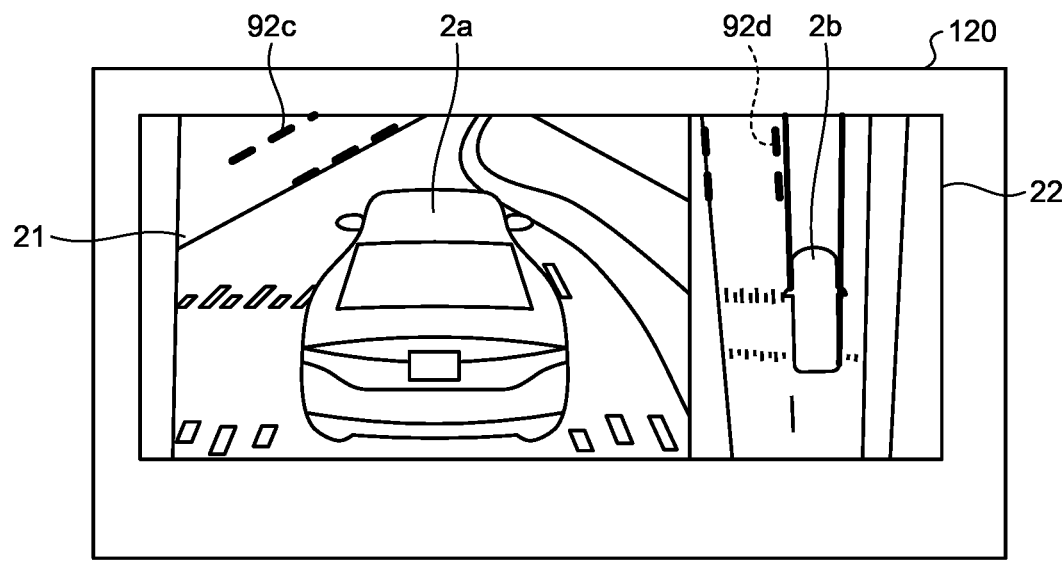
FIG. 16 is a diagram illustrating an example of an image indicating a traveling start position displayed on a display device according to a second modification.

FIG. 16 is a diagram illustrating an example of an image indicating the traveling start position 900 displayed on the display device 120 according to a second modification. In the example illustrated in FIG. 16, both of a second guidance image 92*c* on the front view 21 and a second guidance image 92*d* on the top view 22 are dashed lines representing a position corresponding to a longitudinal direction of the vehicle body 12 in a case in which the vehicle body 12 of the vehicle 1 stops at the traveling start position. In a case of such a display mode, the driver can be easily aware of driving the vehicle 1 to cause the vehicle body 12 to be positioned between the two dashed lines.

The second guidance images 92*c* and 92*d* may be solid lines instead of the dashed lines. Similarly, on the head-up display, the first guidance image may be displayed by dashed lines or solid lines representing the position corresponding to the longitudinal direction of the vehicle body 12.

Third Modification

Each of the first guidance image and the second guidance image does not necessarily have the shape along the shape of the vehicle body 12, but may have a circular shape or an elliptic shape, for example.

Figure 17:
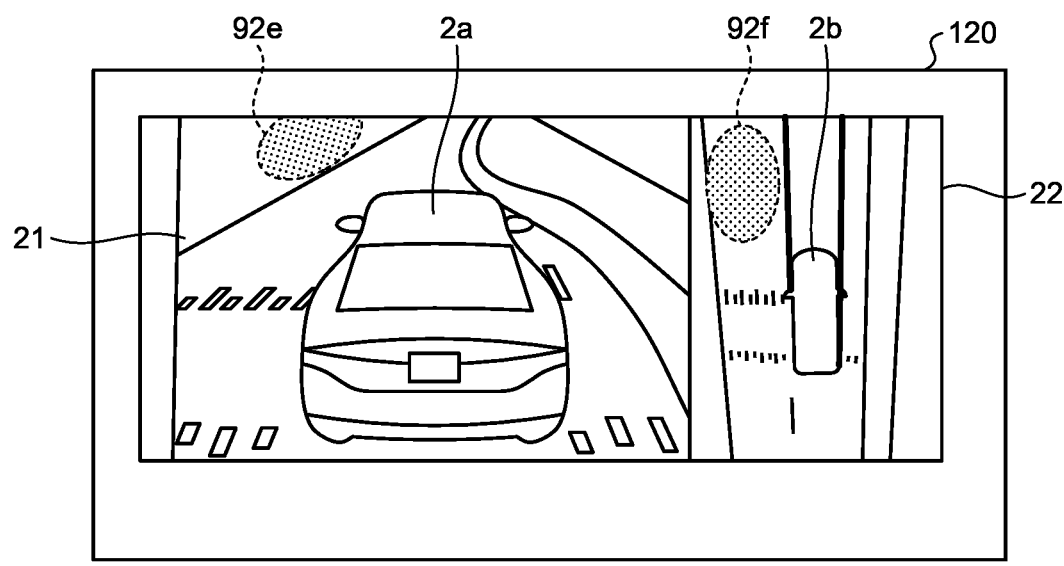
FIG. 17 is a diagram illustrating an example of an image indicating a traveling start position displayed on a display device according to a third modification.

FIG. 17 is a diagram illustrating an example of an image indicating the traveling start position 900 displayed on the display device 120 according to a third modification. As illustrated in FIG. 17, each of a second guidance image 92*e* on the front view 21 and a second guidance image 92*f* on the top view 22 is an ellipse corresponding to the size of the vehicle body 12 of the vehicle 1. Similarly, on the head-up display, the first guidance image having a circular shape or an elliptic shape may be displayed.

Fourth Modification

Figure 18:
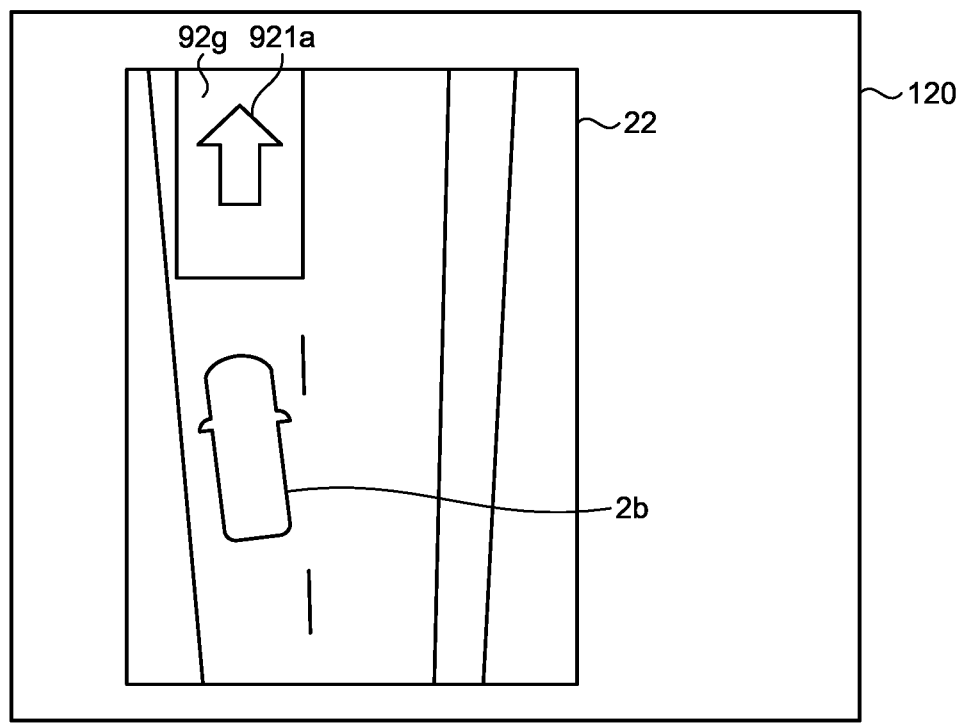
FIG. 18 is a diagram illustrating an example of a second guidance image displayed on a display device according to a fourth modification.

The guidance information may be an image clearly indicating a direction in which the vehicle 1 should be oriented to perform automatic traveling. For example, FIG. 18 is a diagram illustrating an example of a second guidance image 92*g* displayed on the display device 120 according to a fourth modification. In the example illustrated in FIG. 18, the second guidance image 92*g* on the top view 22 includes an arrow image 921*a* representing a direction in which the vehicle 1 should be oriented at the traveling start position 900. Due to this, in a case in which the user moves the vehicle 1 to the traveling start position 900 by manual driving, the user can easily grasp the direction in which the vehicle 1 should be oriented at the traveling start position 900.

Fifth Modification

Figure 19:
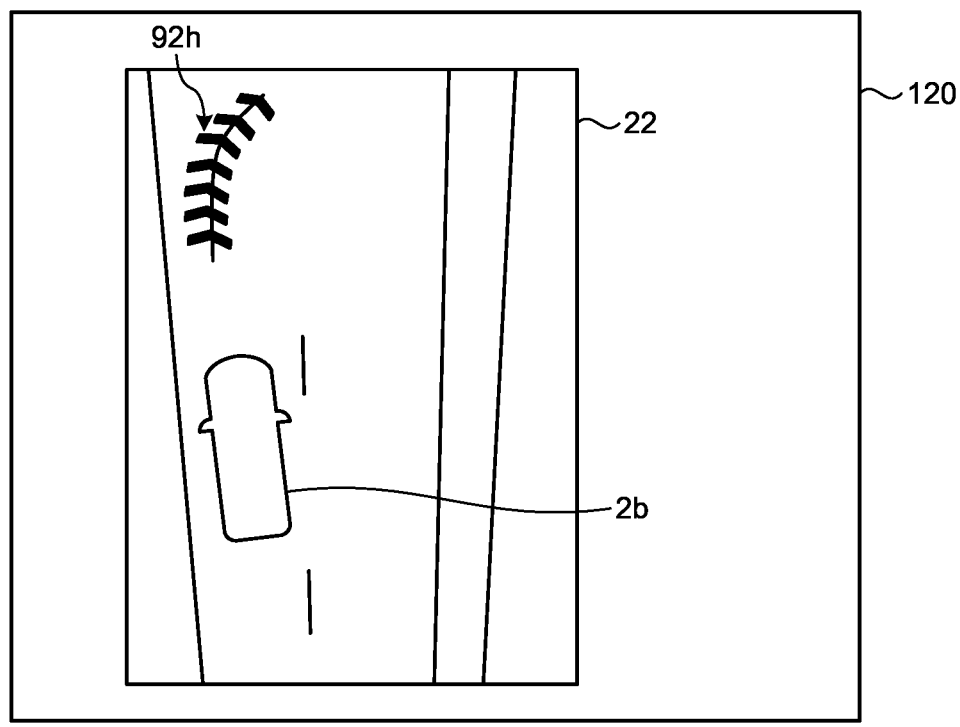
FIG. 19 is a diagram illustrating an example of a second guidance image displayed on a display device according to a fifth modification.

A display mode for clearly indicating the direction in which the vehicle 1 should be oriented is not limited to the display mode exemplified in the fourth modification. FIG. 19 is a diagram illustrating an example of a second guidance image 92*h* displayed on the display device 120 according to a fifth modification. In the example illustrated in FIG. 19, the second guidance image 92*h* on the top view 22 represents the orientation of the vehicle 1 at the traveling start position 900, and change in the orientation of the vehicle 1 on the traveling route 80 extending from the traveling start position 900. Due to such a display mode, the user can also easily grasp the direction in which the vehicle 1 travels by automatic driving started from the traveling start position 900.

FIG. 18 and FIG. 19 exemplify the top view 22. However, the output control module 105 may similarly cause the arrow image 921*a* representing the direction in which the vehicle 1 should be oriented or the second guidance image 92*h* indicating change in the orientation of the vehicle 1 to be displayed on the front view 21 or the head-up display.

Sixth Modification

Figure 20:
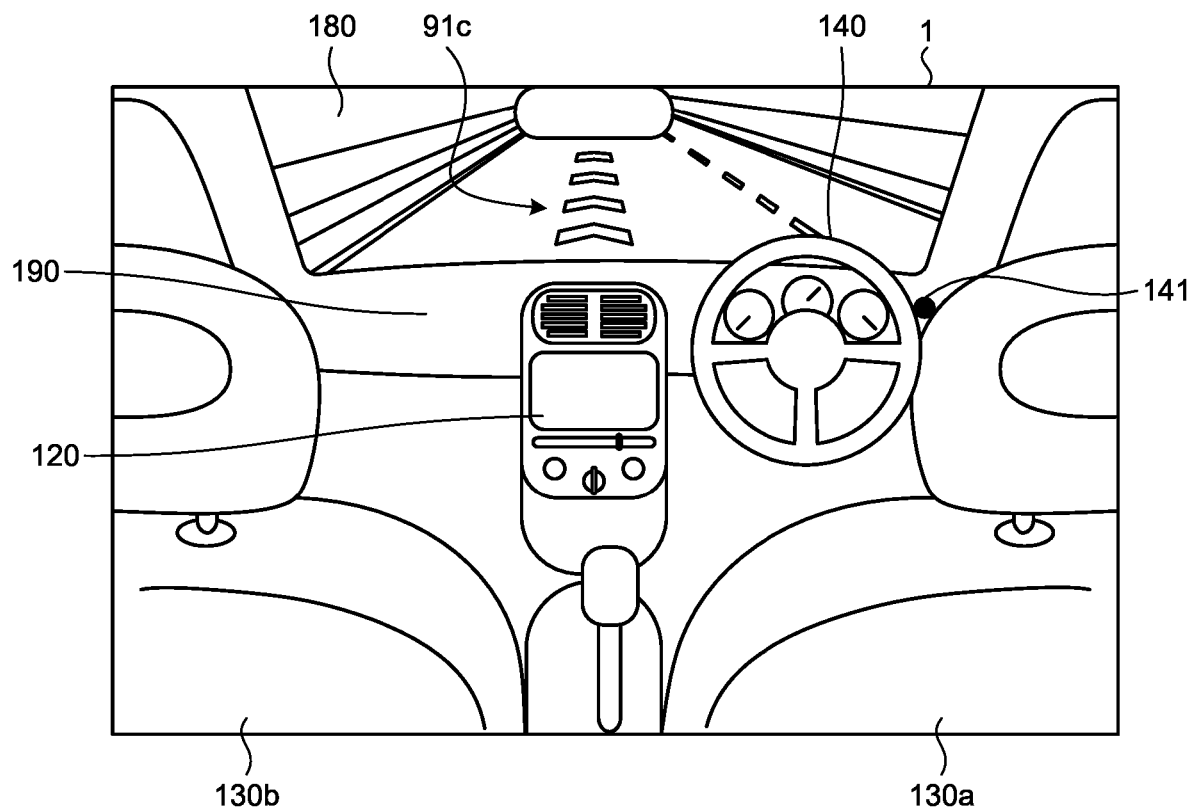
FIG. 20 is a diagram illustrating an example of a first guidance image displayed on a head-up display according to a sixth modification.

FIG. 20 is a diagram illustrating an example of a first guidance image 91*c* displayed on the head-up display according to a sixth modification. In the example illustrated in FIG. 20, the first guidance image 91c represents the direction in which the vehicle 1 should be oriented along the traveling route 80 in the traveling direction of the vehicle 1. Alternatively, the first guidance image 91c may be an image representing a route along which the vehicle 1 moves from the current position to the traveling start position 900 together with the direction in which the vehicle 1 should be oriented.

Seventh Modification

In the embodiments described above, the parking support device 100 uses the traveling route of teacher traveling at the time of learning as the traveling route 80 for automatic traveling in home zone parking. However, a learning method is not limited thereto.

For example, teacher traveling may be traveling by which the driver moves the vehicle 1 from the parking position 910 to a teacher traveling end position outside the parking position by manual driving. In this case, the learning module 103 generates the traveling route 80 for home zone parking by reproducing the route of teacher traveling in a reverse direction.

For example, the driver starts teacher traveling from a state in which the vehicle 1 is stopped at the parking position 910 in the garage 920, and causes the vehicle 1 to move forward to leave the garage 920. The driver then causes the vehicle 1 that has left the garage 920 to move forward to travel to a desired teacher traveling end position, and stops the vehicle 1. The learning module 103 then records the teacher traveling based on steering, braking, and acceleration/deceleration at the time of teacher traveling, and the characteristic points extracted from the surrounding image. The learning module 103 generates the traveling route 80 along which the vehicle 1 moves backward from the teacher traveling end position to travel to the parking position 910 in the garage 920 based on the recorded teacher traveling. In this method, the teacher traveling end position is the traveling start position 900 for automatic traveling. Such a method may also be called "reversely reproducing the traveling route".

Typically, in manual driving, it is easier to cause the vehicle 1 to leave the garage 920 than to cause the vehicle 1 to enter the garage 920. With such a learning method, if the driver is not good at causing the vehicle 1 to move backward to enter the garage 920, the traveling route 80 for home zone parking can be generated by teacher traveling for causing the vehicle 1 to move forward to leave the garage 920 by the driver. In the present modification, exemplified is a case in which the driver causes the vehicle 1 to move forward in teacher traveling, but the driver may cause the vehicle 1 to move backward in teacher traveling.

Eighth Modification

In the embodiments described above, an example of the first sensor information is assumed to be the surrounding image obtained by imaging surroundings of the vehicle 1 at the time of teacher traveling. In the embodiments described above, an example of the second sensor information is assumed to be the surrounding image obtained by imaging surroundings of the vehicle 1 before the vehicle 1 performs automatic traveling based on the learned traveling route, or during the automatic traveling. However, the first sensor information and the second sensor information are not limited to these examples.

For example, a detection result obtained by various sensors such as the wave transmission/reception unit 15 may be assumed to be an example of the first sensor information or the second sensor information. The vehicle 1 may include a ranging device such as Light Detection and Ranging or Laser Imaging Detection and Ranging (LiDAR), or RAdio Detection AND Ranging (RADAR). In this case, a detection result of surroundings of the vehicle 1 obtained by the LiDAR or the RADAR may be assumed to be an example of the first sensor information or the second sensor information. Each of the first sensor information and the second sensor information may be a combination of two or more of the surrounding image, a detection result obtained by the wave transmission/reception unit 15, a detection result obtained by the LiDAR, and the detection result obtained by the RADAR. Each of the first sensor information and the second sensor information may further include information collected by another appliance.

Fourth Embodiment

In the fourth embodiment, the parking support device 100 changes a display mode of the guidance information before the vehicle 1 reaches the position where the vehicle 1 can merge into the traveling route 80 and after the vehicle 1 reaches the position.

A configuration of the vehicle 1 according to the present embodiment is the same as the configuration according to the first embodiment described above with reference to FIG. 1 and FIG. 2. A hardware configuration and functional blocks of the parking support device 100 according to the present embodiment are the same as those in the first embodiment described above with reference to FIG. 4 and FIG. 5. Similarly to the first embodiment, the parking support device 100 according to the present embodiment includes the acquisition module 101, the extraction module 102, the learning module 103, the estimation module 104, the output control module 105, the vehicle control module 106, the reception module 107, and the storage unit 108.

The acquisition module 101, the extraction module 102, the learning module 103, the vehicle control module 106, and the reception module 107 according to the present embodiment have the same functions as those in the first embodiment.

The output control module 105 has the function according to the first embodiment, and also changes the display mode of the guidance information before and after the vehicle 1 reaches the position where the vehicle 1 can merge into the traveling route 80. The following describes change in the display mode of the guidance information with reference to FIG. 21 to FIG. 23.

Figure 21:
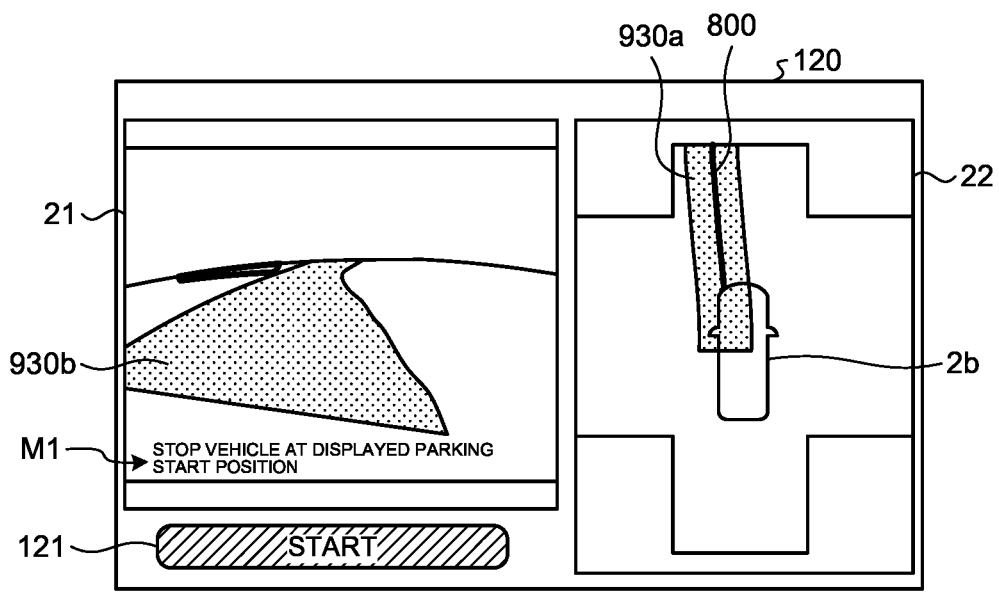
FIG. 21 is a diagram illustrating an example of guidance information that is displayed before a vehicle according to a fourth embodiment reaches a position where the vehicle can merge into a traveling route.

FIG. 21 is a diagram illustrating an example of the guidance information that is displayed before the vehicle 1 according to the fourth embodiment reaches the position where the vehicle 1 can merge into the traveling route 80. In the example illustrated in FIG. 21, both of the front view 21 and the top view 22 are displayed on the display device 120. However, any one of the front view 21 and the top view 22 may be displayed thereon.

A display timing for the guidance information illustrated in FIG. 21 is, for example, a case in which the estimation module 104 determines that the traveling start position 900 or the region in which the vehicle 1 can merge into the traveling route 80 is present within a prescribed distance from the vehicle 1. The present embodiment can be applied to a case in which the vehicle 1 starts automatic traveling from the start position of the traveling route 80, and a case in which the vehicle 1 merges into the traveling route 80 in the middle thereof.

As illustrated in FIG. 21, the output control module 105 causes a traveling route image 800, a traveling region image 930a, and a second vehicle image 2b representing the position of the vehicle body 12 of the vehicle 1 to be displayed as the guidance information on the top view 22. The output control module 105 moves the display position of the second vehicle image 2b on the top view 22 along with movement of the vehicle 1.

The output control module 105 also causes a traveling region image 930b to be displayed on the front view 21. The output control module 105 may also cause a first vehicle image 2a representing the position of the vehicle body 12 of the vehicle 1 to be displayed on the front view 21.

The output control module 105 may also cause a start button 121 to be displayed on the display device 120. The start button 121 is an image button for instructing to start automatic parking based on the traveling route 80. Display text and a shape of the start button 121 are not limited to the example illustrated in FIG. 21.

The traveling route image 800 is an image representing the traveling route 80 at the time of teacher traveling. More specifically, the traveling route image 800 is a line indicating a movement history of the reference point of the vehicle 1 at the time when the vehicle 1 travels on the traveling route 80. The reference point of the vehicle 1 is, for example, a middle point of a line connecting the rear tires 13r on the right and the left sides of the vehicle 1, but is not limited thereto.

The traveling region image 930a is an image representing a traveling region through which a contour of the vehicle 1 passes in a case in which the vehicle 1 travels along the traveling route 80. The traveling region image 930a may be a belt-shaped image having a width corresponding to a vehicle width of the vehicle 1 centered on the traveling route 80, or may be a belt-shaped image indicating a circumscribed region as a region through which the contour of the vehicle 1 has actually passed at the time of teacher traveling. The circumscribed region is assumed to include a region through which the vehicle body 12 passes due to an inner wheel difference, an outer wheel difference, and the like between the front tire 13f and the rear tire 13r of the vehicle 1.

The traveling region is an example of the target position and the region in which the vehicle 1 according to the present embodiment can merge into the traveling route 80. The traveling region images 930a and 930b are examples of the guidance information according to the present embodiment.

The output control module 105 may prompt the driver to move the vehicle 1 to a position represented by the traveling region images 930a and 930b by displaying a message M1 such as "Stop the vehicle at the displayed parking start position" on the display device 120. Content and a display position of the message M1 are not limited to the example illustrated in FIG. 21. Alternatively, the output control module 105 may cause the message M1 to be output from a speaker (not illustrated) as a voice message.

In the example illustrated in FIG. 21, part of the vehicle body 12 of the vehicle 1 overlaps with the traveling region, but the vehicle 1 has not yet reached the position where the vehicle 1 can merge into the traveling route 80. In this case, the output control module 105 causes the start button 121 to be displayed in a state of being unable to be pressed down. For example, the output control module 105 may cause the start button 121 to be displayed in a gray-out state. In a case in which the user operates the start button 121 displayed in the state of being unable to be pressed down, the reception module 107 does not receive the user's operation.

In a case in which the vehicle 1 has not yet reached the position where the vehicle 1 can merge into the traveling route 80, the output control module 105 causes the traveling region images 930a and 930b to be displayed in a first color on the display device 120. The first color is not limited, but may be orange, for example. The first color is an example of a first display mode.

Figure 22:
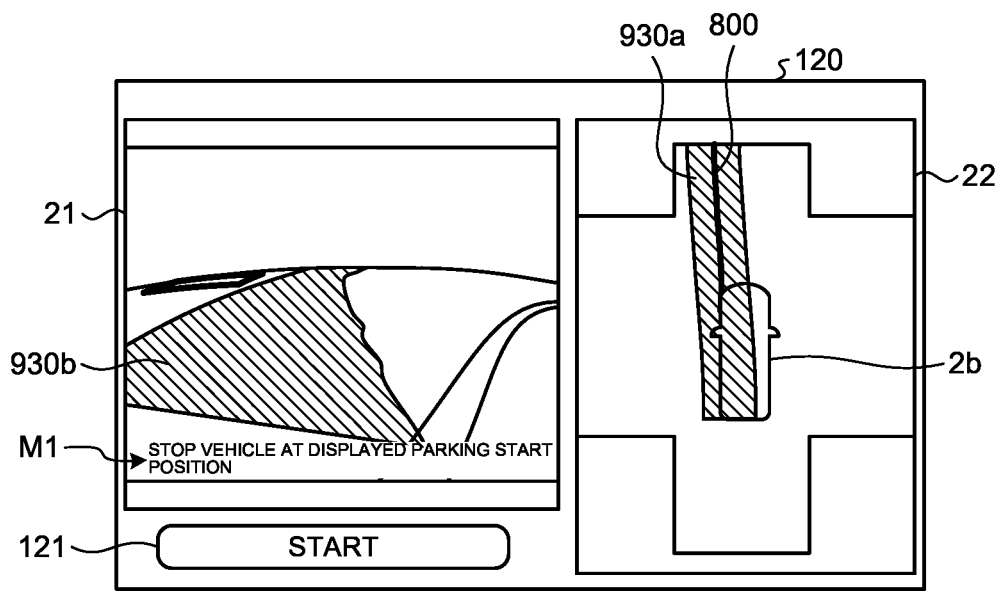
FIG. 22 is a diagram illustrating an example of guidance information that is displayed after the vehicle according to the fourth embodiment reaches the position where the vehicle can merge into the traveling route.

FIG. 22 is a diagram illustrating an example of the guidance information that is displayed after the vehicle 1 according to the fourth embodiment reaches the position where the vehicle 1 can merge into the traveling route 80.

In the example illustrated in FIG. 22, the vehicle 1 has reached the position where the vehicle 1 can merge into the traveling route 80. In this case, the output control module 105 causes the traveling region images 930a and 930b to be displayed in a second color on the display device 120. The second color is not limited, but may be a color different from the first color, for example, green. The second color is an example of a second display mode.

Change in the color of the traveling region images 930a and 930b is an example of change in the display mode of the traveling region images 930a and 930b, and the change in the display mode is not limited thereto. For example, the output control module 105 may cause the traveling region images 930a and 930b to be displayed with blinking until the vehicle 1 reaches the position where the vehicle 1 can merge into the traveling route 80, and may end blinking after the vehicle 1 reaches the position where the vehicle 1 can merge into the traveling route 80.

In a case in which the vehicle 1 reaches the position where the vehicle 1 can merge into the traveling route 80, the output control module 105 causes the start button 121 to be displayed in a state of being able to be pressed down. For example, in a case in which the vehicle 1 reaches the position where the vehicle 1 can merge into the traveling route 80, the output control module 105 causes the gray-out start button 121 to be displayed in a normal state.

In a case in which the user operates the start button 121 displayed in the state of being able to be pressed down, the reception module 107 receives the user's operation. In a case in which the user presses down the start button 121, the vehicle control module 106 starts automatic parking based on the traveling route 80. The user's operation for instructing to start automatic parking based on the traveling route 80 is not limited to pressing down the start button 121, but may be a voice input, operation of a physical button, and the like.

Figure 23:
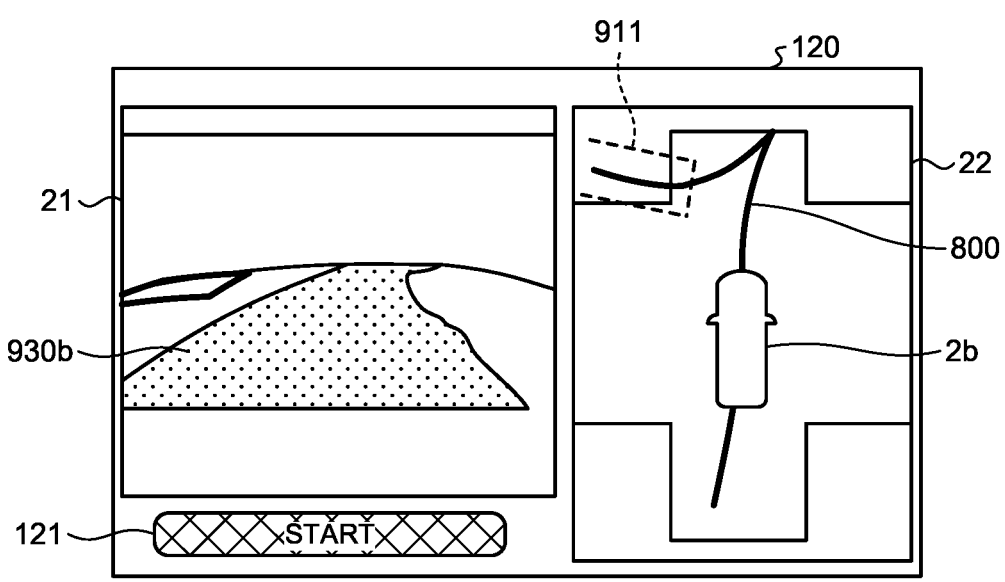
FIG. 23 is a diagram illustrating an example of guidance information that is displayed after the vehicle according to the fourth embodiment starts automatic parking along the traveling route.

FIG. 23 is a diagram illustrating an example of the guidance information that is displayed after the vehicle 1 according to the fourth embodiment starts automatic parking along the traveling route 80. In the example illustrated in FIG. 23, in a case in which the vehicle 1 starts automatic parking along the traveling route 80, the output control module 105 ends display of the traveling region image 930a on the top view 22.

The output control module 105 causes the traveling route image 800 to be continuously displayed. As illustrated in FIG. 23, the output control module 105 may cause a parking position image 911 representing the parking position 910 to be displayed on the top view 22. The user can grasp a scheduled traveling route of the vehicle 1 during automatic traveling by displaying the traveling route image 800 and the parking position image 911 by the output control module 105. The output control module 105 may cause the parking position image 911 to be displayed before the user's operation for instructing to start automatic parking is input. For example, the output control module 105 may cause the parking position image 911 to be displayed on the top view 22 illustrated in FIG. 21 and FIG. 22.

After the start button 121 is pressed down, the output control module 105 causes the start button 121 to be displayed in a display mode different from that before the start button 121 is pressed down. For example, the output control module 105 may change the color of the start button 121 before and after the start button 121 is pressed down.

In the example illustrated in FIG. 23, the output control module 105 causes the traveling region image 930b to be continuously displayed on the front view 21 even after the vehicle 1 starts automatic parking along the traveling route 80, but may end the display.

FIG. 21 to FIG. 23 exemplify the display device 120, but the output control module 105 may cause the head-up display to display the guidance information.

The estimation module 104 according to the present embodiment has the function according to the first embodiment, and also determines whether the vehicle 1 has reached the position where the vehicle 1 can merge into the traveling route 80. For example, in a case in which the position and the orientation of the vehicle 1 satisfy prescribed conditions, the estimation module 104 determines that the vehicle 1 has reached the position where the vehicle 1 can merge into the traveling route 80.

The prescribed condition for the position of the vehicle 1 is, for example, a distance from a current position of the reference point of the vehicle 1 to the traveling route 80 is within a prescribed distance. The prescribed condition for the orientation of the vehicle 1 is, for example, a difference between current orientation of the vehicle 1 and orientation of the vehicle 1 in a case in which the vehicle 1 is positioned at a position closest to the reference point of the vehicle 1 on the traveling route 80 is a prescribed angle or less.

In the present embodiment, the prescribed condition for the position of the vehicle 1 and the prescribed condition for the orientation of the vehicle 1 are AND conditions for determining that the vehicle 1 has reached the position where the vehicle 1 can merge into the traveling route 80. That is, the vehicle control module 106 can start automatic parking in a case in which the position and the orientation of the vehicle 1 satisfy the prescribed conditions, but cannot start automatic parking in a case in which the position and the orientation of the vehicle 1 do not satisfy the prescribed conditions. Thus, in a case in which the position and the orientation of the vehicle 1 do not satisfy the prescribed conditions, the driver is required to manually move the vehicle 1 to the position where the vehicle 1 can merge into the traveling route 80. Values of the prescribed distance and the prescribed angle are not limited, and vary depending on a steering characteristic of the vehicle 1, the size of the vehicle body 12, and the like.

Figure 24:
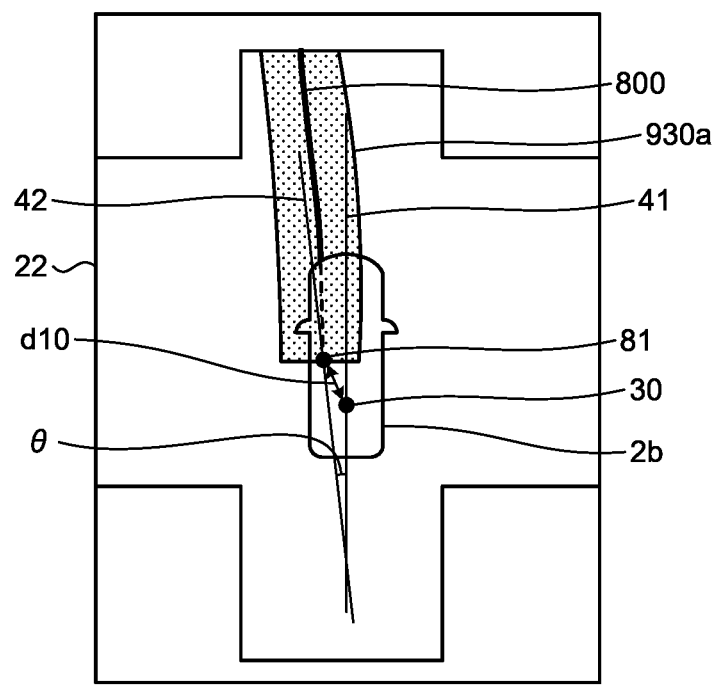
FIG. 24 is a diagram illustrating an example of a state before the vehicle according to the fourth embodiment reaches the position where the vehicle can merge into the traveling route.
Figure 25:
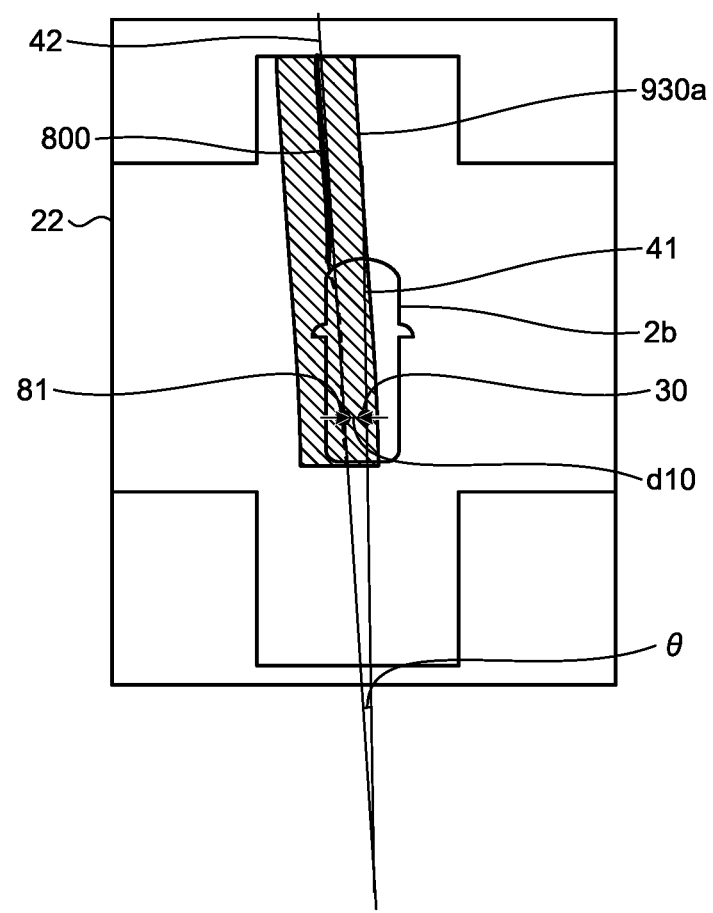
FIG. 25 is a diagram illustrating an example of a state after the vehicle according to the fourth embodiment reaches the position where the vehicle can merge into the traveling route.

The following describes a method of determining whether the vehicle 1 has reached the position where the vehicle 1 can merge into the traveling route 80 with reference to FIG. 24 and FIG. 25.

FIG. 24 is a diagram illustrating an example of a state before the vehicle 1 according to the fourth embodiment reaches the position where the vehicle 1 can merge into the traveling route 80. FIG. 25 is a diagram illustrating an example of a state after the vehicle 1 according to the fourth embodiment reaches the position where the vehicle 1 can merge into the traveling route 80. With reference to FIG. 24 and FIG. 25, the following describes a positional relation between the vehicle 1 and the traveling route 80 using the top view 22.

In the example illustrated in FIG. 24, the position of the vehicle 1 is described based on a reference point 30 as a middle point of a line connecting the rear tires 13r on the right and the left sides of the vehicle 1. The estimation module 104 estimates a distance d10 between the reference point 30 of the vehicle 1 and a position 81 on the traveling route 80 closest to the reference point 30 as a distance from the current position of the reference point 30 of the vehicle 1 to the traveling route 80.

The estimation module 104 employs, as the orientation of the vehicle 1, orientation of a straight line 41 passing through the reference point 30 of the vehicle 1 and perpendicularly intersecting with the line connecting the rear tires 13r on the right and the left sides of the vehicle 1. In FIG. 24, the orientation of the vehicle 1 in a case in which the vehicle 1 is positioned at the position 81 on the traveling route 80 is represented as a straight line 42. The estimation module 104 estimates an angle θ formed by the straight line 41 and the straight line 42 as a difference between the current orientation of the vehicle 1 and the orientation of the vehicle 1 in a case in which the vehicle 1 is positioned at a position closest to the reference point of the vehicle 1 on the traveling route 80. Alternatively, the estimation module 104 may detect, as a difference in the orientation in which the vehicle 1 faces, a difference between the current orientation of the vehicle 1 and the orientation of the vehicle 1 at the time of teacher traveling.

In the example illustrated in FIG. 24, it is assumed that the distance d10 from the position of the reference point 30 of the vehicle 1 to the traveling route 80 is longer than a prescribed distance, and the angle θ formed by the straight line 41 and the straight line 42 is larger than a prescribed angle. With such a position and orientation, the vehicle control module 106 cannot start automatic parking. In this case, the estimation module 104 determines that the vehicle 1 has not reached the position where the vehicle 1 can merge into the traveling route 80. As described above, the prescribed condition for the position of the vehicle 1 and the prescribed condition for the orientation of the vehicle 1 are AND conditions. Thus, even if any one of the conditions is satisfied, the estimation module 104 determines that the vehicle 1 has not reached the position where the vehicle 1 can merge into the traveling route 80 unless the other one of the conditions is satisfied. The determination processing is an example of a determination step according to the present embodiment.

In the example illustrated in FIG. 25, along with movement of the vehicle 1, the distance d10 between the reference point 30 of the vehicle 1 and the position 81 on the traveling route 80 closest to the reference point 30 becomes shorter than that in the example illustrated in FIG. 24. The angle θ formed by the straight line 41 and the straight line 42 also becomes smaller than that in the example illustrated in FIG. 24.

In the example illustrated in FIG. 25, it is assumed that the distance d10 from the position of the reference point 30 of the vehicle 1 to the traveling route 80 is the prescribed distance or less, and the angle θ formed by the straight line 41 and the straight line 42 is larger than the prescribed angle. In this case, the estimation module 104 determines that the vehicle 1 has reached the position where the vehicle 1 can merge into the traveling route 80. In this case, the vehicle control module 106 can start automatic parking.

Regarding the processing of determining whether the vehicle 1 according to the first to the third embodiments has stopped at the traveling start position 900, as illustrated in FIG. 24 and FIG. 25, the determination processing may be performed by using the position of the reference point 30 of the vehicle 1 and the orientation of the vehicle 1. For example, the estimation module 104 may determine that the vehicle 1 has stopped at the traveling start position 900 in a case in which a distance between the current position of the reference point 30 of the vehicle 1 and the position of the reference point 30 in a case in which the vehicle 1 is positioned at the traveling start position 900 at the time of teacher traveling is within the prescribed distance, and a difference between the current orientation of the vehicle 1 and the orientation of the vehicle 1 in a case in which the vehicle 1 is positioned at the traveling start position 900 at the time of teacher traveling is the prescribed angle or less.

In the first to the third embodiments, in a case in which the estimation module 104 determines that the parking start region 801 is present within the prescribed distance from the vehicle 1, the output control module 105 causes the head-up display or the display device 120 to display the traveling start position 900 or the parking start region 801. In this processing, "the orientation of the vehicle 1 satisfies the prescribed condition" may be further added to the condition for displaying the traveling start position 900 or the parking start region 801.

Next, the following describes a procedure of parking support processing performed by the parking support device 100 according to the present embodiment configured as described above.

Figure 26:
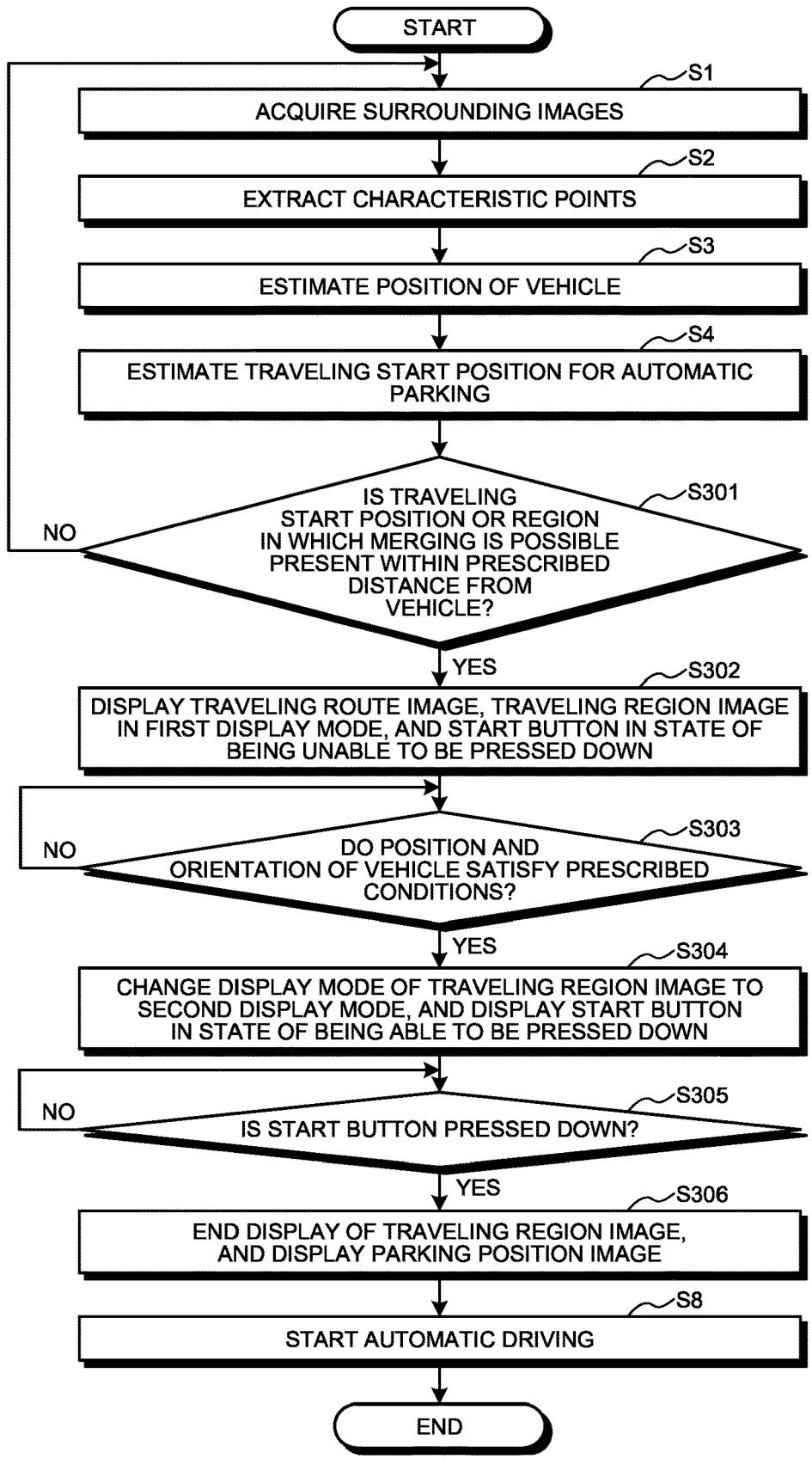
FIG. 26 is a flowchart illustrating an example of a procedure of parking support processing performed by a parking support device according to the fourth embodiment.

FIG. 26 is a flowchart illustrating an example of the procedure of parking support processing performed by the parking support device 100 according to the fourth embodiment.

The processing of acquiring the surrounding image at S1 to the processing of estimating the traveling start position for automatic parking at S4 illustrated in FIG. 26 are the same as those in the first embodiment.

The estimation module 104 then determines whether the traveling start position 900 or the region in which the vehicle 1 can merge into the traveling route 80 is present within the prescribed distance from the vehicle 1 based on the position of the vehicle 1 and the traveling start position 900 that have been estimated (S301). Also in the processing at S5 in the processing procedure according to the first to the third embodiments, whether the region in which the vehicle can merge into the traveling route 80 is present within the prescribed distance from the vehicle 1 may be determined similarly to S301.

Next, as illustrated in FIG. 21, the output control module 105 causes the display device 120 to display the traveling route image 800 and the traveling region images 930*a* and 930*b* in the first display mode. The output control module 105 also causes the display device 120 to display the start button 121 in the state of being unable to be pressed down (S302). At this point, the output control module 105 may cause a speaker (not illustrated) to output, as a voice message, the message M1 for prompting the driver to move the vehicle 1 to the position represented by the traveling region images 930*a* and 930*b*.

The estimation module 104 then determines whether the position and the orientation of the vehicle 1 satisfy the prescribed conditions based on the characteristic points extracted from the acquired surrounding image and the traveling route information read out from the storage unit 108 (S303).

If the position and the orientation of the vehicle 1 do not satisfy the prescribed conditions (No at S303), the estimation module 104 determines that the vehicle 1 has not reached the position where the vehicle 1 can merge into the traveling route 80. In this case, the processing at S303 is repeatedly performed until the driver manually drives the vehicle 1 to move the vehicle 1 to the position where the vehicle 1 can merge into the traveling route 80.

If the position and the orientation of the vehicle 1 satisfy the prescribed conditions (Yes at S303), the estimation module 104 determines that the vehicle 1 has reached the position where the vehicle 1 can merge into the traveling route 80. In this case, as illustrated in FIG. 22, the output control module 105 changes the display mode of the traveling region images 930*a* and 930*b* to the second display mode. The output control module 105 also causes the display device 120 to display the start button 121 in the state of being able to be pressed down (S304).

If the start button 121 displayed in the state of being able to be pressed down is not pressed down by the user (No at S305), the reception module 107 stands by until an operation is performed by the user.

If the start button 121 displayed in the state of being able to be pressed down is pressed down by the user (Yes at S305), the reception module 107 receives an operation of instructing to start automatic parking based on the traveling route 80 performed by the user by pressing down the start button 121. The reception module 107 sends out, to the output control module 105, that the instruction for starting automatic parking based on the traveling route 80 is received. In this case, as illustrated in FIG. 23, the output control module 105 ends display of the traveling region image 930*a*, and causes the display device 120 to display the parking position image 911 (S306). In this case, the vehicle control module 106 starts automatic driving (S8). At this point, the processing of this flowchart ends.

In this way, the parking support device 100 according to the present embodiment changes the display mode of the guidance information before and after the vehicle 1 reaches the position where the vehicle 1 can merge into the traveling route 80. Thus, the parking support device 100 according to the present embodiment can enable the driver of the vehicle 1 to easily grasp whether the vehicle 1 has reached the position where the vehicle 1 can merge into the traveling route 80 while exhibiting the same effect as that in the first embodiment.

The parking support device 100 according to the present embodiment causes the traveling region images 930*a* and 930*b* to be displayed in the first color on the display device 120 before the vehicle 1 reaches the position where the vehicle 1 can merge into the traveling route 80, and causes the traveling region images 930*a* and 930*b* to be displayed in the second color different from the first color on the display device 120 after the vehicle 1 reaches the position where the vehicle 1 can merge into the traveling route 80. Due to this, with the parking support device 100 according to the present embodiment, the driver of the vehicle 1 can easily visually recognize whether the vehicle 1 has reached the position where the vehicle 1 can merge into the traveling route 80.

The parking support device 100 according to the present embodiment determines that the vehicle 1 has reached the position where the vehicle 1 can merge into the traveling route 80 in a case in which the position and the orientation of the vehicle 1 satisfy the prescribed conditions. Due to this, with the parking support device 100 according to the present embodiment, it is possible to determine, with high accuracy, whether the vehicle 1 is caused to be in a state in which automatic driving can be performed by the vehicle control module 106.

The configuration of the parking support device 100 according to the present embodiment may be combined with the configurations according to the first to the eighth modifications described above.

Fifth Embodiment

A fifth embodiment describes automatic parking based on the traveling route 80 recorded by using a method other than teacher traveling.

The configuration of the vehicle 1 according to the present embodiment is the same as the configuration in the first embodiment described above with reference to FIG. 1 and FIG. 2. A hardware configuration and functional blocks of the parking support device 100 according to the present embodiment are the same as those in the first embodiment described above with reference to FIG. 4 and FIG. 5. Similarly to the first embodiment, the parking support device 100 according to the present embodiment includes the acquisition module 101, the extraction module 102, the learning module 103, the estimation module 104, the output control module 105, the vehicle control module 106, the reception module 107, and the storage unit 108.

The acquisition module 101, the extraction module 102, the estimation module 104, and the reception module 107 according to the present embodiment have the same functions as those in the first embodiment.

The vehicle control module 106 according to the present embodiment has a function of automatic parking by automatic driving. More specifically, the vehicle control module 106 generates a traveling route for parking the vehicle 1 at a parking target position determined by the user, and moves the vehicle 1 to the parking target position based on the generated traveling route to perform automatic parking. To perform automatic parking by the vehicle control module 106 according to the present embodiment, a known technique can be employed. A parking operation by automatic driving is an example of a parking operation performed in the past in the present embodiment.

The parking target position at the time of automatic driving may be a section divided by a white line or the like, or may be a space without a mark such as a white line. In a case in which a mark such as a white line is not present, the user may input the parking target position on the front view 21 or the top view 22 displayed on the display device 120. The reception module 107 receives a user's operation for inputting the parking target position.

The learning module 103 according to the present embodiment causes the storage unit 108 to store the traveling route 80 on which the vehicle 1 has traveled in automatic parking performed by the vehicle control module 106, the traveling start position 900, and the parking target position. For example, the learning module 103 learns change of the position of the vehicle 1 based on change of the characteristic points extracted from the surrounding images that are taken during automatic parking. The learning module 103 also learns a speed, a steering angle, and a braking operation of the vehicle 1 during automatic parking. The learning module 103 also defines a surrounding environment of the vehicle 1 as a map based on the characteristic points extracted from the surrounding images that are taken during automatic driving, and causes the storage unit 108 to store the map.

In the automatic parking performed a plurality of times, the learning module 103 may cause the storage unit 108 to store only the traveling route 80, the traveling start position 900, and the parking target position, at the time of the automatic parking selected by the user as a target to be stored, and may discard information about the traveling route 80, the traveling start position 900, and the parking target position at the time that is not selected by the user as a target to be stored.

For example, after causing the storage unit 108 to temporarily store the traveling route 80 on which the vehicle 1 has traveled in automatic parking performed by the vehicle control module 106, the traveling start position 900, and the parking target position, the learning module 103 may formally register, as traveling route information to be used in the next time or following times, the traveling route 80, the traveling start position 900, and the parking target position in a case in which the traveling route 80, the traveling start position 900, and the parking target position are selected by the user as targets to be stored after automatic parking is completed.

The output control module 105 according to the present embodiment causes the head-up display or the display device 120 to display the guidance information based on the traveling route information recorded by automatic parking in the past performed by the vehicle control module 106.

Figure 27:
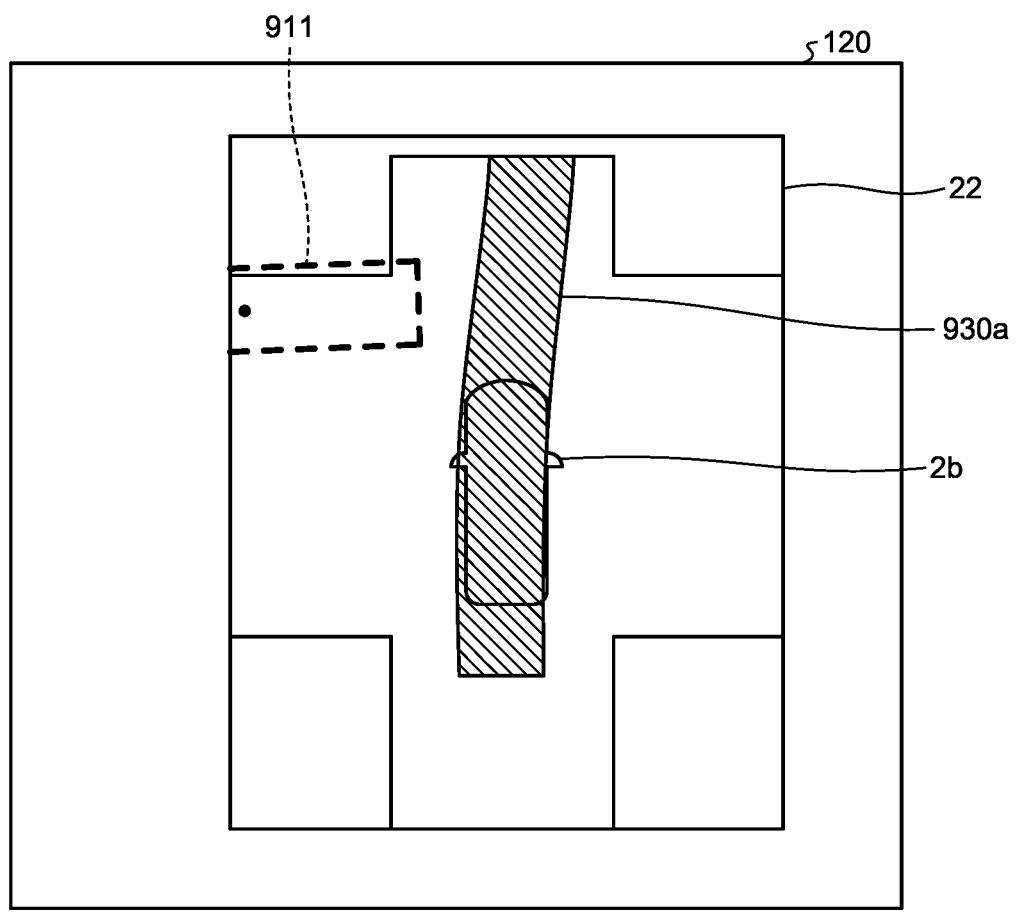
FIG. 27 is a diagram illustrating an example of guidance information according to a fifth embodiment.

FIG. 27 is a diagram illustrating an example of the guidance information according to the fifth embodiment. In the example illustrated in FIG. 27, the output control module 105 causes the display device 120 to display the top view 22. On the top view 22, the second vehicle image 2b, the traveling region image 930a representing a traveling region through which the contour of the vehicle 1 passes in a case in which the vehicle 1 travels along the traveling route 80 in automatic parking in the past performed by the vehicle control module 106, and the parking position image 911 representing the parking position 910 are displayed.

The output control module 105 may cause the front view 21 to be displayed, or may cause the traveling route image 800 to be displayed.

Similarly to the fourth embodiment, the output control module 105 according to the present embodiment changes the display mode of the guidance information before and after the vehicle 1 reaches the position where the vehicle 1 can merge into the traveling route 80.

In the example illustrated in FIG. 27, similarly to the example illustrated in FIG. 22, the vehicle 1 has reached the position where the vehicle 1 can merge into the traveling route 80, so that the output control module 105 causes the traveling region images 930a and 930b to be displayed in the second display mode. In a case in which the vehicle 1 has not reached the position where the vehicle 1 can merge into the traveling route 80, the output control module 105 causes the traveling region images 930a and 930b to be displayed in the first display mode.

In this way, also in a case of performing automatic parking based on the traveling route 80 recorded by the parking operation by automatic driving performed in the past, the parking support device 100 according to the present embodiment can enable the driver of the vehicle 1 to easily grasp whether the vehicle 1 has reached the position where the vehicle 1 can merge into the traveling route 80 while exhibiting the same effect as that in the first embodiment.

The configuration of the parking support device 100 according to the present embodiment may be combined with the configurations according to the first to the eighth modifications described above.

In the present embodiment, it is assumed that the parking support device 100 stores the traveling route 80 for the parking operation by automatic driving. However, the learning module 103 of the parking support device 100 may cause the storage unit 108 to store information related to at least one of the traveling route 80 and the parking target position. For example, the learning module 103 may store only the parking target position at the time of automatic parking without storing the traveling route 80. For example, the parking target position is a position determined by the user as the parking target position of the vehicle 1 at the time of parking operation by automatic driving.

In this case, the vehicle control module 106 generates a traveling route for causing the vehicle 1 to automatically travel from the current position of the vehicle 1 to the parking target position registered in the past. The output control module 105 causes the head-up display or the display device 120 to display the guidance information based on the traveling route generated by the vehicle control module 106. For example, the output control module 105 may cause a belt-shaped image representing a traveling region along the generated traveling route to be displayed.

Alternatively, for example, the learning module 103 may store the parking target position and the traveling start position 900 at the time of automatic parking. In this case, the output control module 105 may cause the head-up display or the display device 120 to display the guidance information based on the traveling start position 900 at the time of automatic parking.

With the parking support method and the parking support device according to the present disclosure, the driver can easily grasp the position where the vehicle can move to the parking position by automatic driving based on the traveling route.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking support method of performing automatic traveling of a vehicle based on a parking operation performed in the past, the parking support method comprising:
   storing, in a storage, information on at least one of a traveling route and a parking target position based on the parking operation performed in the past; and
   displaying, on a display, first guidance information based on a target position where automatic traveling of the vehicle is able to be performed based on the at least one of the traveling route and the parking target position,
   wherein the parking operation performed in the past is teacher traveling performed by a driver of the vehicle,
   the storing includes storing the traveling route for parking the vehicle at the parking target position based on first sensor information on surroundings of the vehicle acquired by a first sensor mounted on the vehicle during the parking operation performed in the past,
   the target position is where the vehicle is able to move to the parking target position by the automatic traveling,
   the parking support method further comprises estimating a position of the vehicle and the target position based on second sensor information obtained by acquiring the surroundings of the vehicle,
   the target position includes a region in which the vehicle is able to merge into the traveling route,
   the region includes a belt-shaped region along the traveling route, and
   a width of the belt-shaped region becomes narrower as a road distance to the target position is shorter.

2. The parking support method according to claim 1, wherein the first guidance information includes the target position, and an orientation of the vehicle for enabling the automatic traveling of the vehicle when the vehicle is positioned at the target position.

3. The parking support method according to claim 1, wherein the target position includes a start position of the traveling route.

4. The parking support method according to claim 1, wherein the displaying of the first guidance information includes changing a display mode of a traveling region before and after the vehicle reaches the target position where the vehicle is able to merge into the traveling route.

5. The parking support method according to claim 4, wherein the displaying of the first guidance information includes causing the display to display the region in a first color before the vehicle reaches the target position where the vehicle is able to merge into the traveling route, and to display the region in a second color different from the first color after the vehicle reaches the target position where the vehicle is able to merge into the traveling route.

6. The parking support method according to claim 1, further comprising:
   determining that the vehicle has reached the target position where the vehicle is able to merge into the traveling route when the position and an orientation of the vehicle satisfy prescribed conditions.

7. The parking support method according to claim 1, wherein the method begins displaying a message asking the driver of the vehicle whether to start the automatic traveling of the vehicle based on the teacher traveling when a distance to the target position and an orientation of the vehicle satisfy prescribed conditions.

8. The parking support method according to claim 1, further comprising:
   controlling the vehicle to move to the target position.

9. The parking support method according to claim 1, wherein
   the display includes a head-up display,
   the first guidance information indicates the position of the vehicle, and
   the first guidance information is displayed on the head-up display.

10. The parking support method according to claim 1, wherein
    the display is disposed on a dashboard of the vehicle, and
    the first guidance image indicates the target position where the vehicle is able to move to the parking target position on a front view or a top view displayed on the display.

11. The parking support method according to claim 1, further comprising:
    acquiring position information of the vehicle;
    estimating a distance to the parking target position from the position of the vehicle based on the position information; and
    reporting to a user that the parking target position is close to the user when the distance is a threshold or less, wherein the estimating is performed when receiving an operation from a user for starting the automatic traveling toward the parking target position after a report is made in response to the reporting.

12. The parking support method according to claim 11, wherein
the position information includes Global Positioning System (GPS) position information, and
the estimating the distance includes estimating the position of the vehicle based on the GPS position information and a movement amount of the vehicle after a time point when the GPS position information is acquired.

13. The parking support method according to claim 1, wherein
the teacher traveling includes traveling by which the driver moves the vehicle from a traveling start position outside the parking target position to the parking target position by manual driving, and
the storing includes learning the traveling start position in the teacher traveling as a start position of the traveling route.

14. The parking support method according to claim 1, wherein
the teacher traveling includes traveling by which the driver moves the vehicle from the parking target position to a teacher traveling end position outside the parking target position by manual driving, and
the storing includes storing, in the storage, the teacher traveling end position as a start position of the traveling route, and the traveling route on which the vehicle travels in a reverse direction than the teacher traveling.

15. A parking support device for performing automatic traveling of a vehicle based on a parking operation performed in the past, the parking support device comprising:
a memory; and
a processor coupled to the memory and configured to:
cause the memory to store information on at least one of a traveling route and a parking target position based on a parking operation performed in the past; and
cause a display to display first guidance information based on a target position where automatic traveling of the vehicle is able to be performed based on the at least one of the traveling route and the parking target position,
wherein the parking operation performed in the past is teacher traveling performed by a driver of the vehicle,
the processor causes the memory to store the traveling route for parking the vehicle at the parking target position based on first sensor information on surroundings of the vehicle acquired by a first sensor mounted on the vehicle during the parking operation performed in the past,
the target position is where the vehicle is able to move to the parking target position by the automatic traveling,
the processor further estimates a position of the vehicle and the target position based on second sensor information obtained by acquiring the surroundings of the vehicle,
the target position includes a region in which the vehicle is able to merge into the traveling route,
the region includes a belt-shaped region along the traveling route, and a width of the belt-shaped region becomes narrower as a road distance to the target position is shorter.

16. A parking support method of performing automatic traveling of a vehicle based on a parking operation performed in the past, the parking support method comprising:
storing, in a storage, information on at least one of a traveling route and a parking target position based on the parking operation performed in the past; and
controlling the vehicle to move to the parking target position based on a target position where automatic traveling of the vehicle is able to be performed based on the at least one of the traveling route and the parking target position,
wherein the parking operation performed in the past is teacher traveling performed by a driver of the vehicle,
the target position is where the vehicle is able to move to the parking target position by the automatic traveling,
the target position includes a region in which the vehicle is able to merge into the traveling route,
the region is along the traveling route,
a width of the region becomes narrower as a road distance to the target position is shorter.

* * * * *